(12) United States Patent
Ngo et al.

(10) Patent No.: US 11,309,968 B2
(45) Date of Patent: Apr. 19, 2022

(54) OPTICAL TRANSMISSION DEVICE AND OPTICAL TRANSMISSION METHOD

(71) Applicant: FUJITSU LIMITED, Kawasaki (JP)

(72) Inventors: Anh Ha Ngo, Kawasaki (JP); Takafumi Terahara, Kawasaki (JP); Naoki Ainaka, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/231,038

(22) Filed: Apr. 15, 2021

(65) Prior Publication Data

US 2022/0006530 A1    Jan. 6, 2022

(30) Foreign Application Priority Data

Jul. 6, 2020 (JP) .............................. JP2020-116247

(51) Int. Cl.
*H04B 10/40* (2013.01)
*H04B 10/25* (2013.01)
*H04J 14/02* (2006.01)

(52) U.S. Cl.
CPC ............. *H04B 10/40* (2013.01); *H04B 10/25* (2013.01); *H04J 14/0201* (2013.01)

(58) Field of Classification Search
CPC ...... H04B 10/25; H04B 10/40; H04B 10/275; H04J 14/021; H04J 14/0201
USPC ........................................................ 398/135
See application file for complete search history.

(56) References Cited

U.S. PATENT DOCUMENTS

| | | | | |
|---|---|---|---|---|
| 5,956,165 A | * | 9/1999 | Fee .................... | H04B 10/27 398/78 |
| 7,773,883 B1 | * | 8/2010 | Weng ................... | H04J 14/0227 398/83 |
| 2003/0180047 A1 | * | 9/2003 | Way ...................... | H04L 12/437 398/59 |
| 2006/0269295 A1 | * | 11/2006 | Way ...................... | H04B 10/506 398/183 |
| 2011/0069975 A1 | | 3/2011 | Liu et al. | |

(Continued)

FOREIGN PATENT DOCUMENTS

| | | |
|---|---|---|
| JP | 2013-505676 A | 2/2013 |
| JP | 2015-220590 A | 12/2015 |
| JP | 2017-158031 A | 9/2017 |

*Primary Examiner* — Dalzid E Singh
(74) *Attorney, Agent, or Firm* — Fujitsu Patent Center

(57) ABSTRACT

Optical transmission device is provided in one of a plurality of nodes in an optical network. Different carrier frequencies are respectively allocated to the plurality of nodes. The optical transmission device includes: transmitter, splitter and receiver. The transmitter generates a first subcarrier optical signal with a first subcarrier established on a low-frequency side of a first carrier frequency and a second subcarrier optical signal with a second subcarrier established on a high-frequency side of the first carrier frequency. The splitter splits an optical signal including the first subcarrier optical signal and the second subcarrier optical signal. The output of the splitter is guided to first and second adjacent nodes. The receiver recovers data carried by the first subcarrier and data carried by the second subcarrier from received optical signal. A difference between carrier frequencies of adjacent nodes corresponds to a bandwidth of the subcarrier.

8 Claims, 17 Drawing Sheets

(56) References Cited

U.S. PATENT DOCUMENTS

| | | | |
|---|---|---|---|
| 2012/0195588 A1* | 8/2012 | Way | H04J 14/0241 398/4 |
| 2015/0147063 A1* | 5/2015 | Winzer | H04J 14/0276 398/79 |
| 2015/0333835 A1 | 11/2015 | Matsukawa | |
| 2018/0167159 A1* | 6/2018 | Barnard | H04B 10/572 |
| 2019/0245627 A1 | 8/2019 | Rahn et al. | |

* cited by examiner

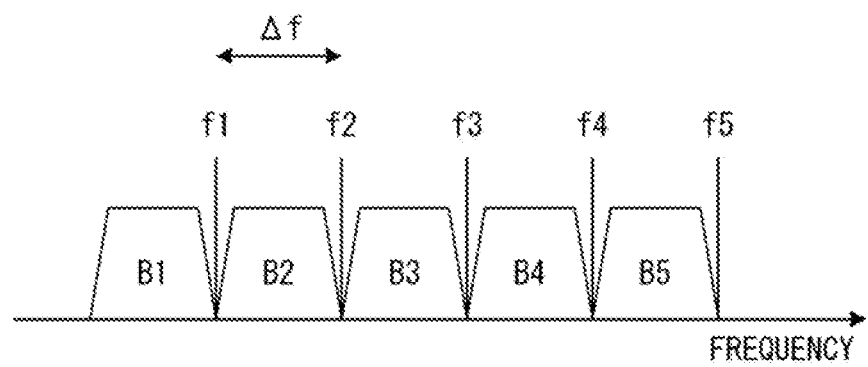
F I G. 3

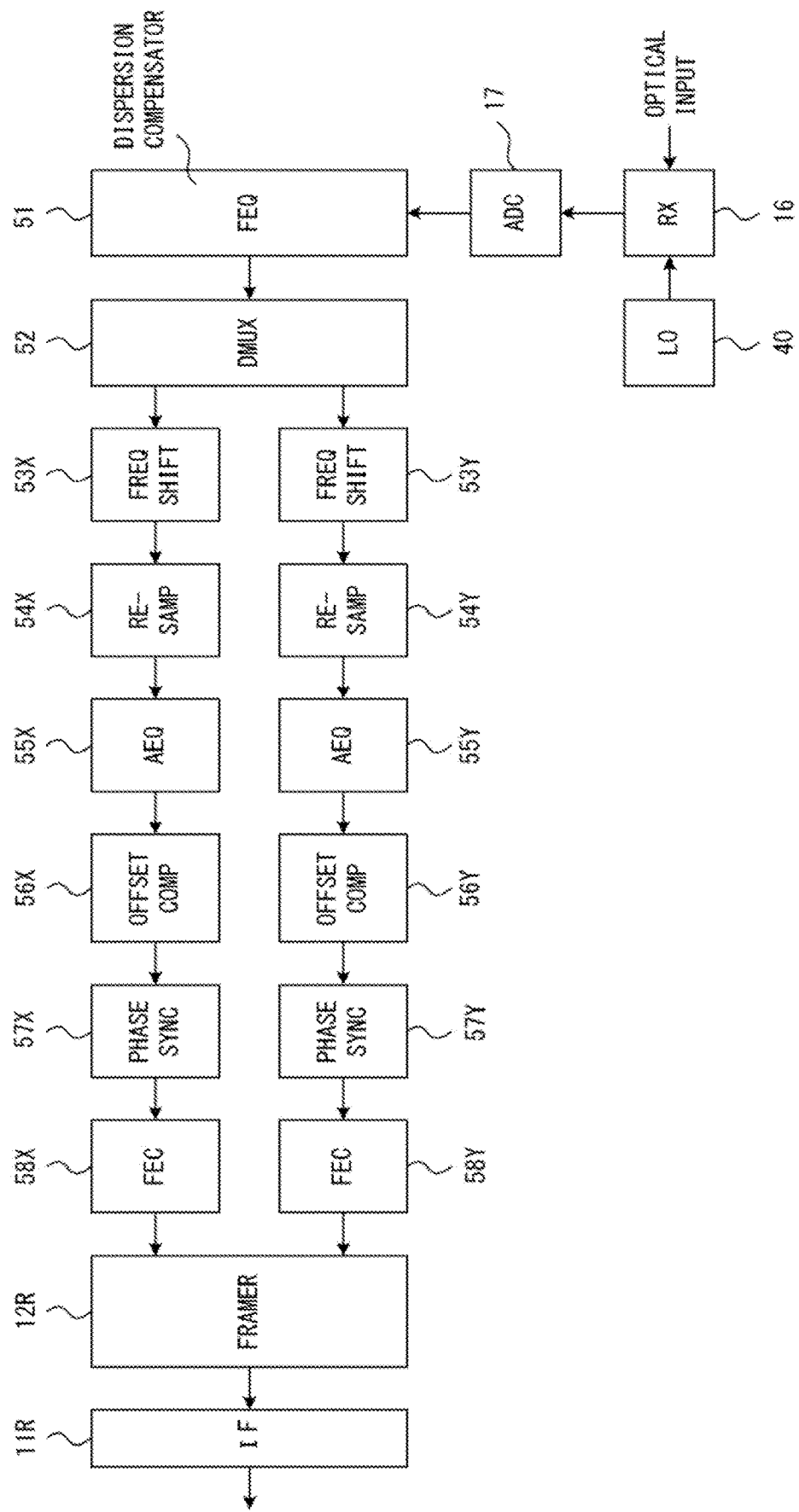
F I G. 7

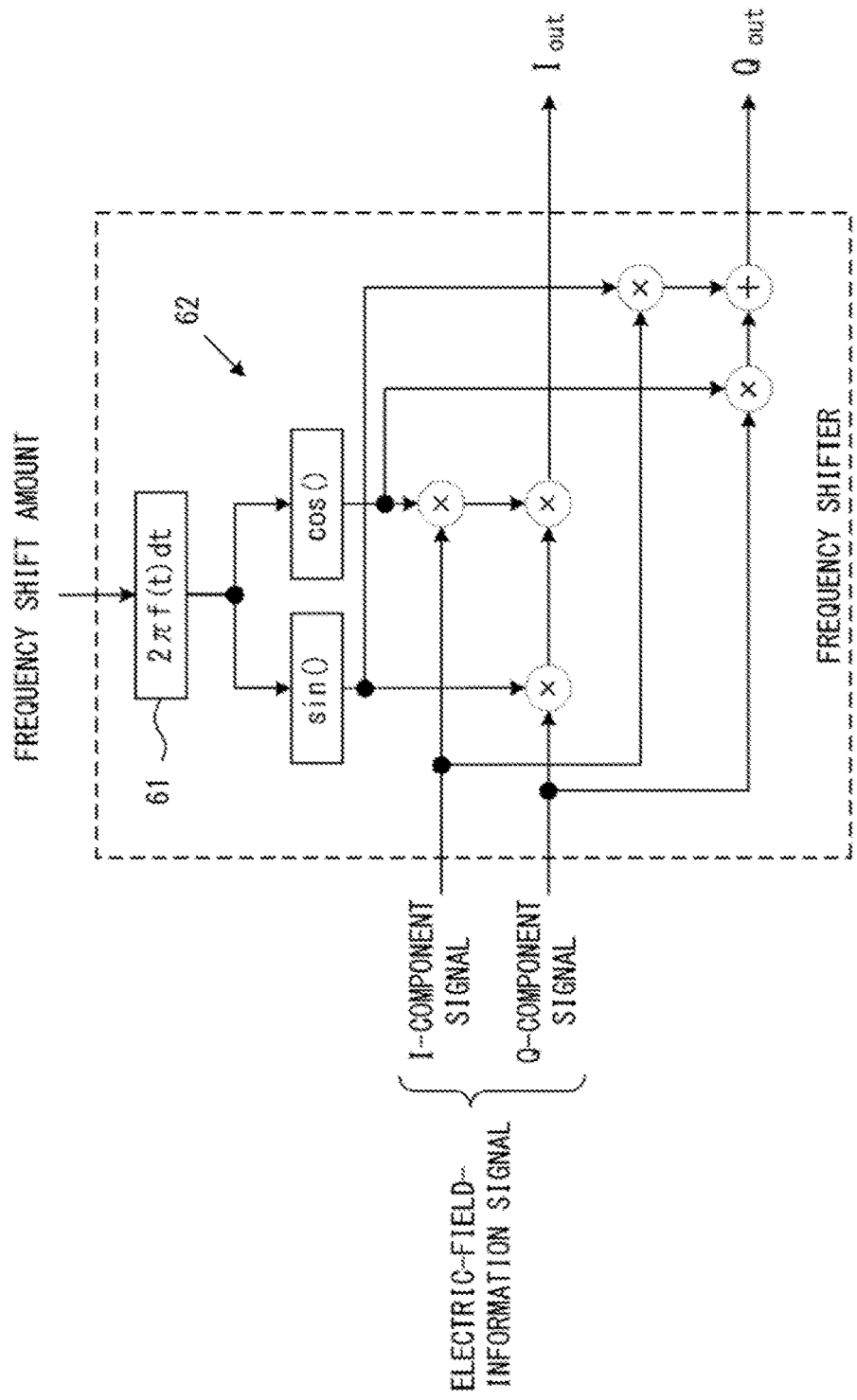
F I G. 9

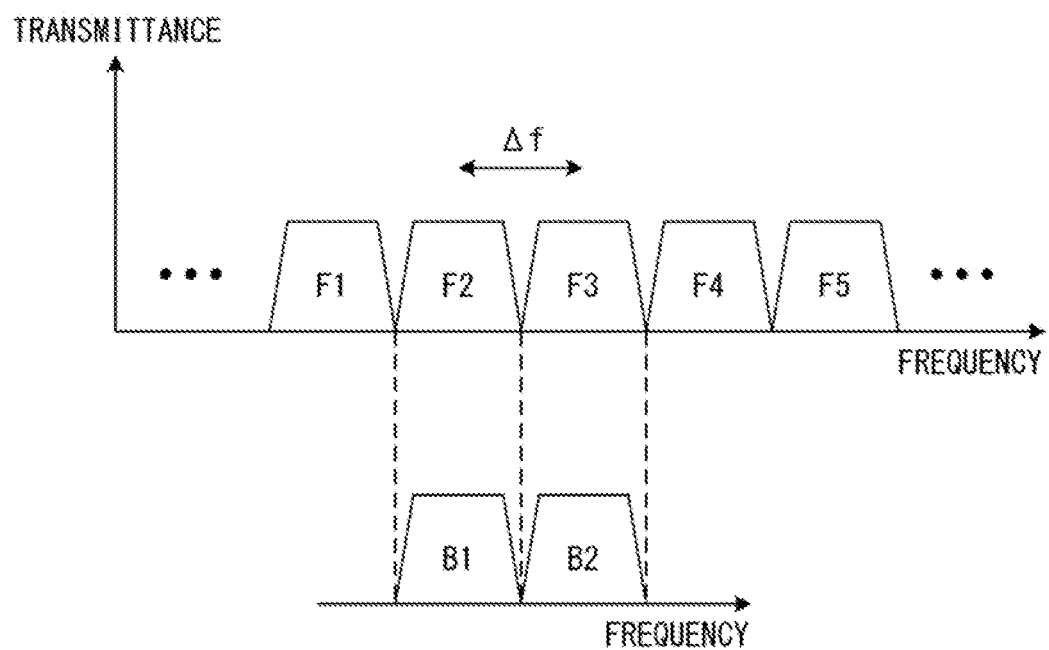
F I G. 14

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2020-116247, filed on Jul. 6, 2020, the entire contents of which are incorporated herein by reference.

FIELD

The embodiments discussed herein are related to an optical transmission device and an optical transmission method.

BACKGROUND

FIG. 1 illustrates an example of a conventional optical communication system. The optical communication system includes a plurality of nodes connected by optical fibers. The plurality of nodes form a ring network. The ring network can transmit optical signals in a clockwise direction and a counterclockwise direction.

Each of the nodes is provided with an optical transmission device. The optical transmission device includes two optical transceivers. In this example, the optical transceiver is implemented by a transponder (TR). Thus, the optical transmission device includes two transponders. The transponders transmit/receive optical signals to/from adjacent nodes. For example, an optical transmission device implemented in a node #2 may include transponders TR1 and TR2. The transponder TR1 transmits/receives an optical signal to/from a node #1. The transponder TR2 transmits/receives an optical signal to/from a node #3.

A switch circuit (SW/IF) is connected to the optical transmission device of each of the nodes. The switch circuit can accommodate a plurality of clients. The switch circuit provides an interface between the optical communication system and the clients.

In the meantime, various optical transmission schemes have been proposed (e.g., U.S. Patent Publication No. 2019/0245627, Japanese Laid-open Patent Publication No. 2017-158031, Japanese Laid-open Patent Publication No. 2015-220590, and Japanese National Publication of International Patent Application No. 2013-505676).

Large-capacity transponders have been developed in recent years. For example, transponders having a communication bandwidth of 400-800 Gbps have been put into practical use. In a city area with a high population density, since a large communication capacity is required, large-capacity transponders are preferably implemented in nodes in an optical network. However, a large communication capacity may be unrequired depending on the area. For example, a rural area may require a communication capacity of about 100-300 Gbps. Hence, if large-capacity transponders are, as seen in a city area with a high population density, implemented in an optical network in an area that does not require a large communication capacity, this could disable the full use of transponder capabilities, thereby decreasing the bandwidth (or spectrum) use efficiency. In this case, the cost of establishing the optical network will be unnecessarily high. For example, when establishing the optical ring network depicted in FIG. 1, each node will be provided with two transponders. Alternatively, a fixed optical add drop multiplexer or a re-configurable optical add drop multiplexer may need to be additionally provided. Thus, each transponder will have a reduced spectrum use efficiency, and the costs for the optical transmission devices will be increased.

SUMMARY

According to an aspect of the embodiments, an optical transmission device is provided in a first node among a plurality of nodes included in an optical network. Different carrier frequencies are respectively allocated to the plurality of nodes. The optical transmission device includes: a first light source configured to generate local oscillation light of a first carrier frequency that is allocated to the first node; a transmitter configured to generate, by using the local oscillation light, a first subcarrier optical signal with a first subcarrier established on a low-frequency side of the first carrier frequency and a second subcarrier optical signal with a second subcarrier established on a high-frequency side of the first carrier frequency; an optical splitter configured to split an optical signal including the first subcarrier optical signal and the second subcarrier optical signal to generate a first optical signal to be transmitted to a first adjacent node and a second optical signal to be transmitted to a second adjacent node; an optical coupler configured to combine an optical signal received from the first adjacent node and an optical signal received from the second adjacent node; and a receiver configured to recover, by using the local oscillation light, a first reception signal carried by the first subcarrier and a second reception signal carried by the second subcarrier from an output optical signal of the optical coupler. A difference between a frequency of the first light source and a frequency of a light source implemented in the first adjacent node corresponds to a bandwidth of the first subcarrier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of carrier frequencies and subcarriers allocated to nodes;

FIG. 7 illustrates an example of a receiver in a transponder implemented in an optical transmission device;

FIG. 9 illustrates an example of a frequency shifter;

FIG. 14 illustrates an example of providing an optical filter by means of a cyclic filter;

DESCRIPTION OF EMBODIMENTS

First Embodiment

Figure 2:
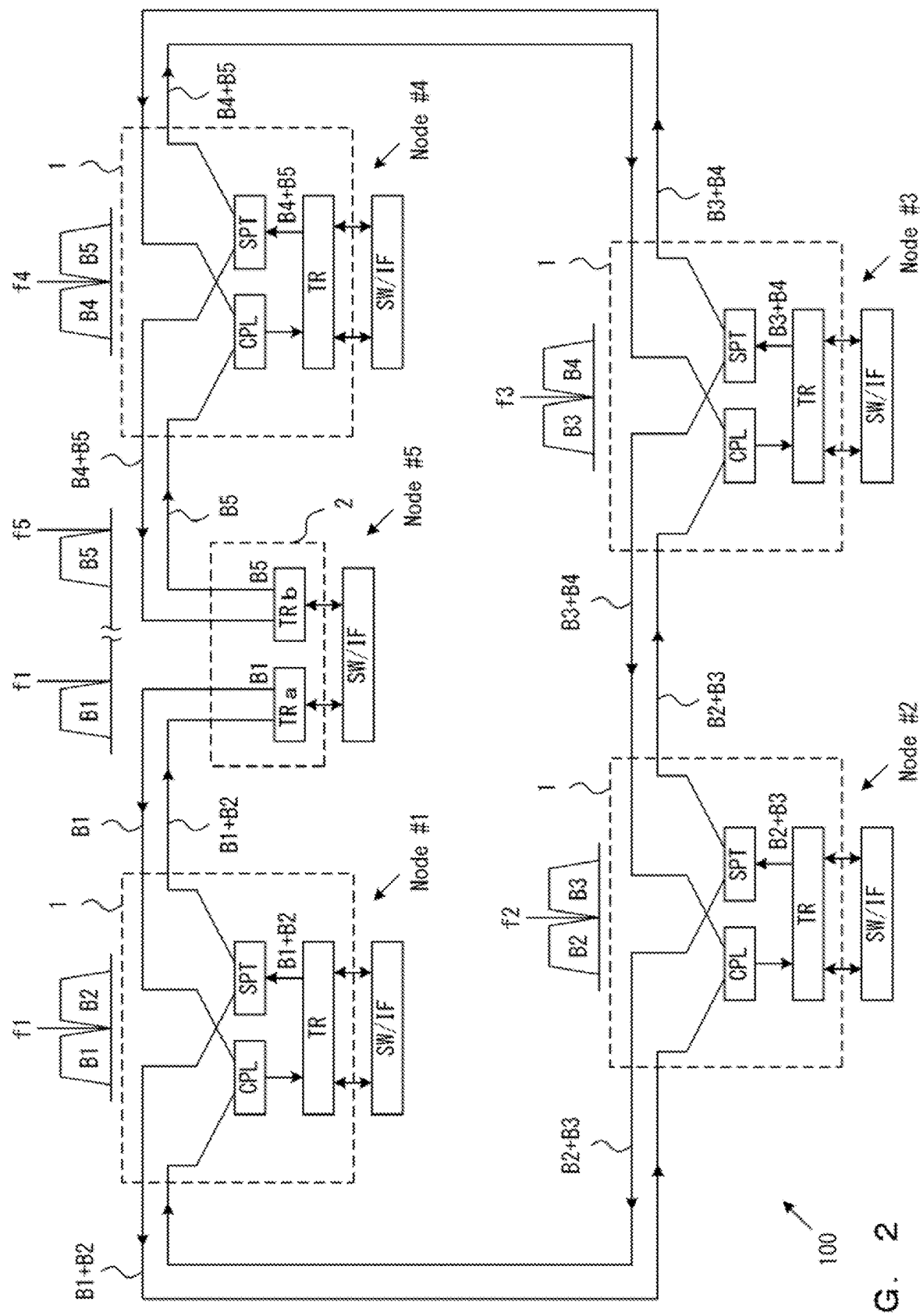
FIG. 2 illustrates an example of an optical communication system in accordance with a first embodiment of the invention.

FIG. 2 illustrates an example of an optical communication system in accordance with a first embodiment of the invention. In this example, an optical communication system 100 in accordance with the first embodiment includes nodes #1-#5. The nodes #1-#5 are connected by optical fibers and form an optical ring network. The optical ring network can transmit optical signals in a clockwise direction and a counterclockwise direction.

Each of the nodes is provided with an optical transmission device 1. However, one of the nodes #1-#5 is provided with an optical transmission device 2. In this example, the nodes #1-#4 are each provided with an optical transmission device 1, and the node #5 is provided with an optical transmission device 2.

The optical transmission device 1 includes a transponder TR, an optical splitter SPT, and an optical coupler CPL. The optical transmission device 1 may include other circuits or functions that are not depicted in FIG. 2. A switch circuit SW/IF is connected to the optical transmission device 1. The switch circuit SW/IF can accommodate a plurality of clients. The switch circuit SW/IF provides an interface between the optical communication system 100 and the clients.

The optical transmission device 2 includes transponders TRa and TRb. The optical transmission device 2 may include other circuits or functions that are not depicted in FIG. 2. A switch circuit SW/IF is also connected to the optical transmission device 2, as with the optical transmission device 1.

Different carrier frequencies (or wavelengths) are allocated to the nodes #1-#5 in the optical communication system 100. In this example, carrier frequencies f1-f5 are respectively allocated to the nodes #1-#5. In addition to the carrier frequency f5, the carrier frequency f1 is allocated to the node #5 in which the optical transmission device 2 is implemented.

The carrier frequencies f1-f5 allocated to the nodes #1-#5 are established with an equal spacing as depicted in FIG. 3. In this example, the carrier frequencies f1-f5 are established at a frequency spacing $\Delta f$, and the frequency spacing $\Delta f$ is half or approximately half of the maximum communication bandwidth of the transponder TR. Thus, when, for example, the maximum communication bandwidth of the transponder TR is 800 Gbps, $\Delta f$ will be 400 Gbps or about 400 Gbps. Note that the maximum communication bandwidth of the transponder TR corresponds to the communication capacity or the maximum communication transmission rate of the transponder TR. When the transponder TR processes a signal by using a digital signal processor (DSP), the maximum communication bandwidth of the transponder TR may correspond to the processing capacity of the DSP.

Each of the nodes #1-#4 can transmit data to an adjacent node by using two subcarriers. In this example, each of the nodes #1-#4 uses two subcarriers corresponding to the carrier frequency allocated to the node. In particular, a node #i (i=1 to 4) uses a subcarrier adjacent to a carrier frequency fi and provided on the low-frequency side and a subcarrier adjacent to the carrier frequency fi and provided on the high-frequency side.

For example, the carrier frequency f1 may be allocated to the node #1. Thus, as indicated in FIG. 2, the node #1 can transmit data by using subcarriers B1 and B2. The subcarrier B1 is established on the low-frequency side of the carrier frequency f1 and adjacent to the carrier frequency f1, and the subcarrier B2 is established on the high-frequency side of the carrier frequency f1 and adjacent to the carrier frequency f1. Similarly, the node #2 transmits data by using subcarriers B2 and B3 adjacent to the carrier frequency f2. The node #3 transmits data by using subcarriers B3 and B4 adjacent to the carrier frequency f3. The node #4 transmits data by using subcarriers B4 and B5 adjacent to the carrier frequency f4. Descriptions of the node #5 will be given hereinafter.

Each of the nodes #1-#4 allocates a pair of subcarriers to data to be transmitted to a pair of nodes adjacent to the node. For example, the node #1 may allocate the subcarrier B1 to data to be transmitted to the node #5 and allocate the subcarrier B2 to data to be transmitted to the node #2. Each of the nodes #1-#4 generates a pair of subcarrier optical signals by using a pair of subcarriers. For example, the node #1 may generate subcarrier optical signals B1 and B2. The transponder TR combines the pair of generated subcarrier optical signals and outputs the combined signals. An optical signal obtained by combining a subcarrier optical signal Bi and a subcarrier optical signal Bj may hereinafter be referred to as a "subcarrier optical signal Bi+Bj."

An optical signal output from the transponder TR in each of the nodes #1-#4 is split by the optical splitter SPT and transmitted to a pair of nodes adjacent to the node. In this case, the same optical signal is transmitted to the pair of adjacent nodes. For example, the node #1 may generate a subcarrier optical signal B1+B2. Thus, the subcarrier optical signal B1+B2 is transmitted from the node #1 to the node #2, and the subcarrier optical signal B1+B2 is also transmitted from the node #1 to the node #5. Similarly, a subcarrier optical signal B2+B3 is transmitted from the node #2 to the nodes #1 and #3. A subcarrier optical signal B3+B4 is transmitted from the node #3 to the nodes #2 and #4. A subcarrier optical signal B4+B5 is transmitted from the node #4 to the nodes #3 and #5.

The bandwidths of two subcarriers established for a carrier frequency allocated to a certain node are the same. The difference between a carrier frequency allocated to a certain node and a carrier frequency allocated to a node adjacent to the certain node is the same as or almost the same as the bandwidth of the subcarrier.

Each of the nodes #1-#4 recovers data from optical signals received from nodes adjacent to the node. In this case, each of the nodes #1-#4 combines an optical signal received from one of the adjacent nodes with an optical signal received from the other. Then, according to the combined optical signals, data transmitted from one of the adjacent nodes and data transmitted from the other are recovered.

Figure 4A:
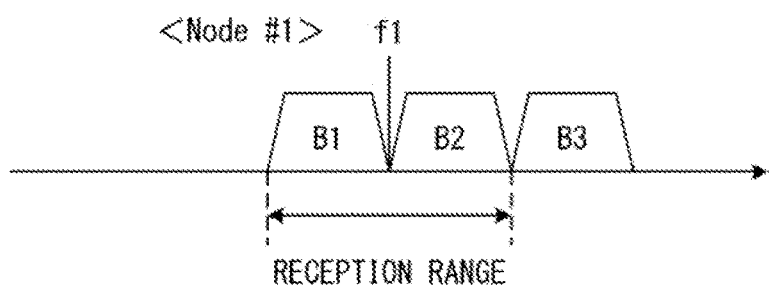
FIGS. 4A-4E are explanatory diagrams for receiving operations performed in nodes.
Figure 4B:
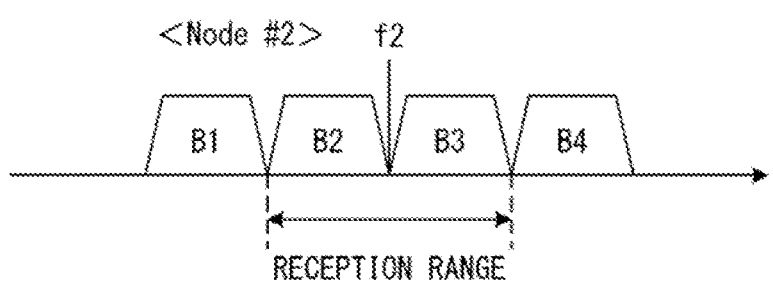

For example, as depicted in FIG. 2, the node #2 may receive a subcarrier optical signal B1+B2 from the node #1 and receive a subcarrier optical signal B3+B4 from the node #3. Then, the subcarrier optical signal B1+B2 and the subcarrier optical signal B3+B4 are combined by the optical coupler CPL. Thus, as depicted in FIG. 4B, the transponder TR in the node #2 receives subcarriers B1-B4. The node #2 converts received optical signals into a baseband signal by using local oscillation light. In this case, since the carrier frequency f2 is allocated to the node #2, the node #2 generates local oscillation light of the carrier frequency f2. Meanwhile, the maximum communication bandwidth of the transponder TR is, in this example, twice the bandwidth of each subcarrier. Thus, the node #2 extracts a signal in a frequency region that is twice the bandwidth of the subcarrier with the carrier frequency f2 as the center. In particular, the node #2 extracts subcarriers B2 and B3, as depicted in FIG. 4B.

The node #2 recovers data from each of the extracted subcarriers. Specifically, data transmitted from the node #1 is recovered from the subcarrier B2, and data transmitted from the node #3 is recovered from the subcarrier B3.

Figure 4C:
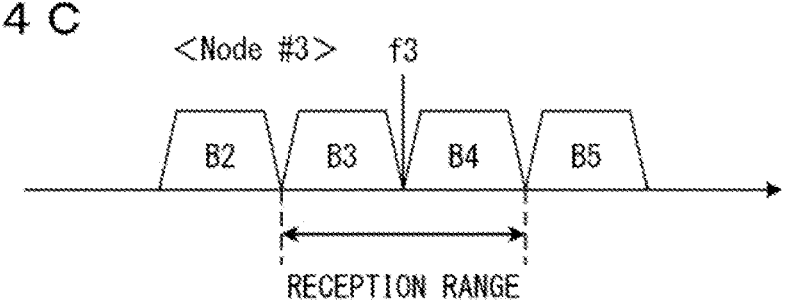

Similarly, as depicted in FIG. 2, the node #3 receives a subcarrier optical signal B2+B3 from the node #2 and receives a subcarrier optical signal B4+B5 from the node #4. The node #3 also receives an optical signal by using local oscillation light of the carrier frequency f3. The node #3 extracts subcarriers B3 and B4, as depicted in FIG. 4C. Thus, the node #3 recovers, from the subcarrier B3, data transmitted from the node #2 and recovers, from the subcarrier B4, data transmitted from the node #4.

As described above, the optical communication system 100 in accordance with the first embodiment is such that the carrier frequencies allocated to the nodes #1-#5 are sequentially shifted in a spacing of Δf. However, in this situation, one node of the nodes #1-#5 will have a large difference between the frequency of a subcarrier used for communication with one of the nodes adjacent to the one node and the frequency of a subcarrier used for communication with the other adjacent node. In the case depicted in FIG. 2, in the node #5, a difference between the center frequency of the subcarrier B1 used for communication with the node #1 and the center frequency of the subcarrier B5 used for communication with the node #4 is greater than the maximum communication bandwidth of the transponder TR. Hence, the node #5 cannot communicate with the two nodes adjacent to the node #5 by using one transponder TR. Thus, the node #5 is provided with two transponders TRa and TRb, and two carrier frequencies f1 and f5 are allocated to the node #5. The transponder TRa performs subcarrier communication using the carrier frequency f1. The transponder TRb performs subcarrier communication using the carrier frequency f5.

In particular, the transponder TRa in the node #5 generates and transmits a subcarrier optical signal B1 to the node #1. The transponder TRb generates and transmits a subcarrier optical signal B5 to the node #4.

In this case, as depicted in FIG. 2, the node #1 receives the subcarrier optical signal B1 from the node #5 and receives a subcarrier optical signal B2+B3 from the node #2. At this time, the node #1 receives an optical signal by using local oscillation light of the carrier frequency f1. Furthermore, the node #1 extracts subcarriers B1 and B2, as depicted in FIG. 4A. Thus, the node #1 recovers, from the subcarrier B1, data transmitted from the node #5 and recovers, from the subcarrier B2, data transmitted from the node #2.

Figure 4D:
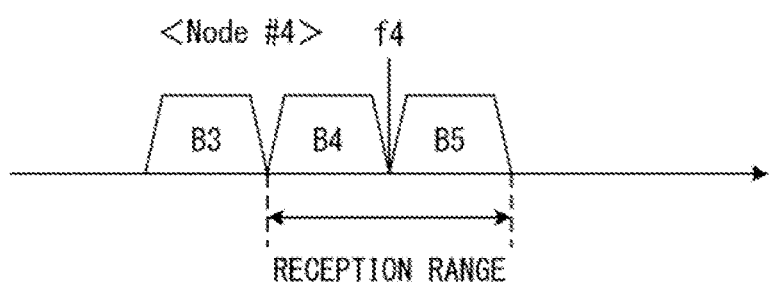

As depicted in FIG. 2, the node #4 receives a subcarrier optical signal B3+B4 from the node #3 and receives a subcarrier optical signal B5 from the node #5. At this time, the node #4 receives an optical signal by using local oscillation light of the carrier frequency f4. The node #4 extracts subcarriers B4 and B5, as depicted in FIG. 4D. Thus, the node #4 recovers, from the subcarrier B4, data transmitted from the node #3 and recovers, from the subcarrier B5, data transmitted from the node #5.

Figure 4E:
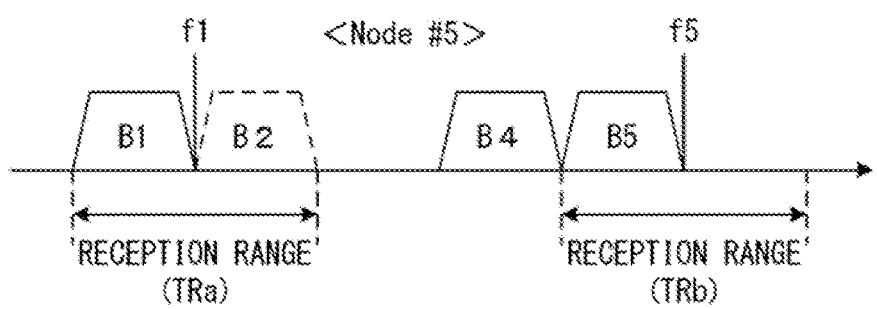

As depicted in FIG. 2, the node #5 receives a subcarrier optical signal B4+B5 from the node #4 and receives a subcarrier optical signal B1+B2 from the node #1. In this case, as depicted in FIG. 4E, the transponder TRa receives the optical signal by using local oscillation light of the carrier frequency f1, and the transponder TRb receives the optical signal by using local oscillation light of the carrier frequency f5. Thus, the transponder TRa extracts the subcarriers B1 and B2. However, the subcarrier B2 carries data to be transmitted to the node #2. Accordingly, the transponder TRa recovers data from the subcarrier B1 but does not recover data from the subcarrier B2. Meanwhile, the transponder TRb extracts the subcarrier B5. The transponder TRb recovers data from the subcarrier B5. Thus, the node #5 recovers, from the subcarrier B1, data transmitted from the node #1 and recovers, from the subcarrier B5, data transmitted from the node #4.

Figure 5:
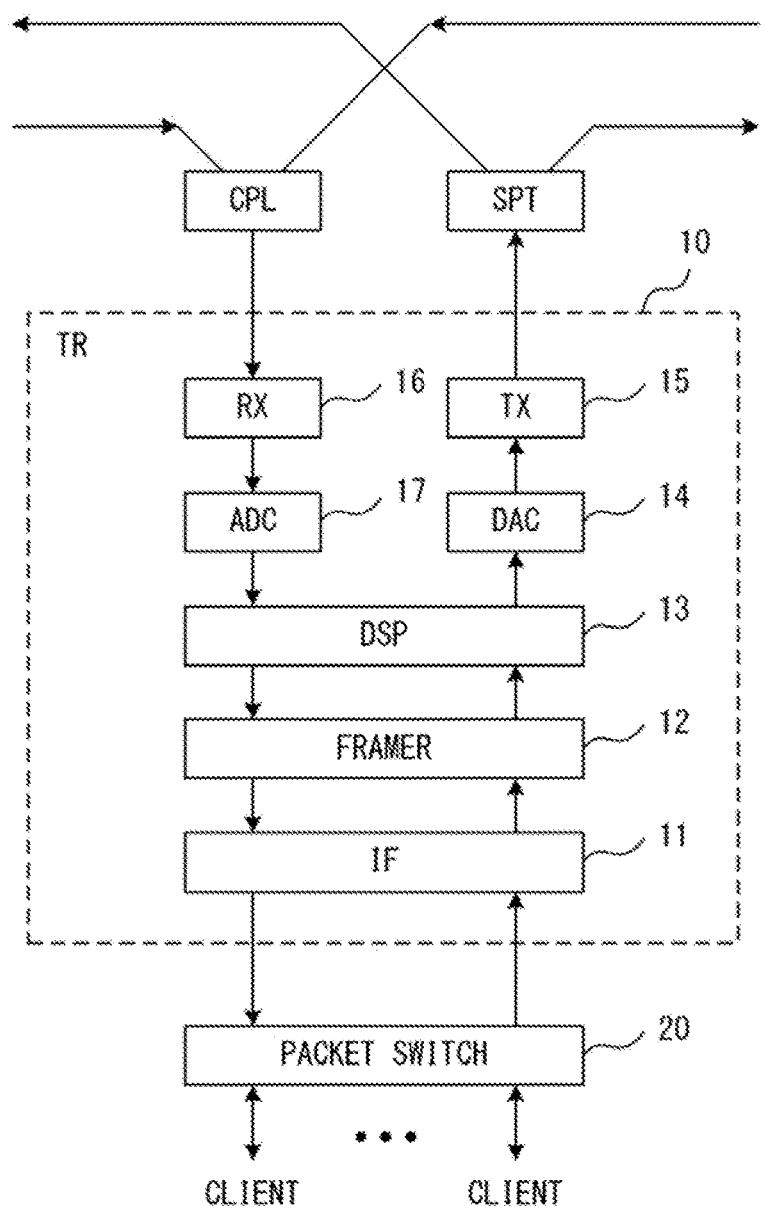
FIG. 5 illustrates an example of an optical transmission device.

FIG. 5 illustrates an example of the optical transmission device 1. In this example, the optical transmission device 1 includes a transponder 10, an optical splitter SPT, an optical coupler CPL, and a packet switch 20. The optical transmission device 1 may also include other elements that are not depicted in FIG. 5. In the example depicted in FIG. 5, the packet switch 20 is included in the optical transmission device 1. However, the packet switch 20 may be connected to the optical transmission device 1. In the optical communication system 100 depicted in FIG. 2, the optical transmission device 1 is provided for each of the nodes #1-#4.

The packet switch 20 guides a packet received from a client to the transponder 10. The packet switch 20 also guides a packet output from the transponder 10 to a corresponding client. However, the packet switch 20 may return, to the transponder 10, a packet received from the transponder 10, depending on the destination of the packet.

The transponder 10 includes an interface 11, a framer 12, a digital signal processor (DSP) 13, a digital-to-analog converter (DAC) 14, an optical transmitter (TX) 15, an optical receiver (RX) 16, and an analog-to-digital converter (ADC) 17. The transponder 10 may also include other elements that are not depicted in FIG. 5.

The interface 11 provides an interface between the optical transmission device 10 and the packet switch 20. The framer 12 stores a packet received via the interface 11 in a specified frame (e.g., an OTN frame). The framer 12 extracts a packet from a received frame recovered by the DSP 13.

The DSP 13 generates a transmission signal indicating a frame output from the framer 12. The DAC 14 converts the transmission signal generated by the DSP 13 into an analog signal. The optical transmitter 15 generates a modulated optical signal by modulating local oscillation light with the transmission signal. The optical signal generated by the optical transmitter 15 is split by the optical splitter SPT and transmitted to two adjacent nodes.

The optical coupler CPL combines optical signals received from the two adjacent nodes. The optical receiver 16 is a coherent receiver and generates an electric-field-information signal indicating a received optical signal by using local oscillation light. The ADC 17 converts the electric-field-information signal into a digital signal. The DSP 13 recovers a bit string according to an electric-fieldinformation signal indicating a received optical signal and reconstructs a frame from the bit string.

Figure 6:
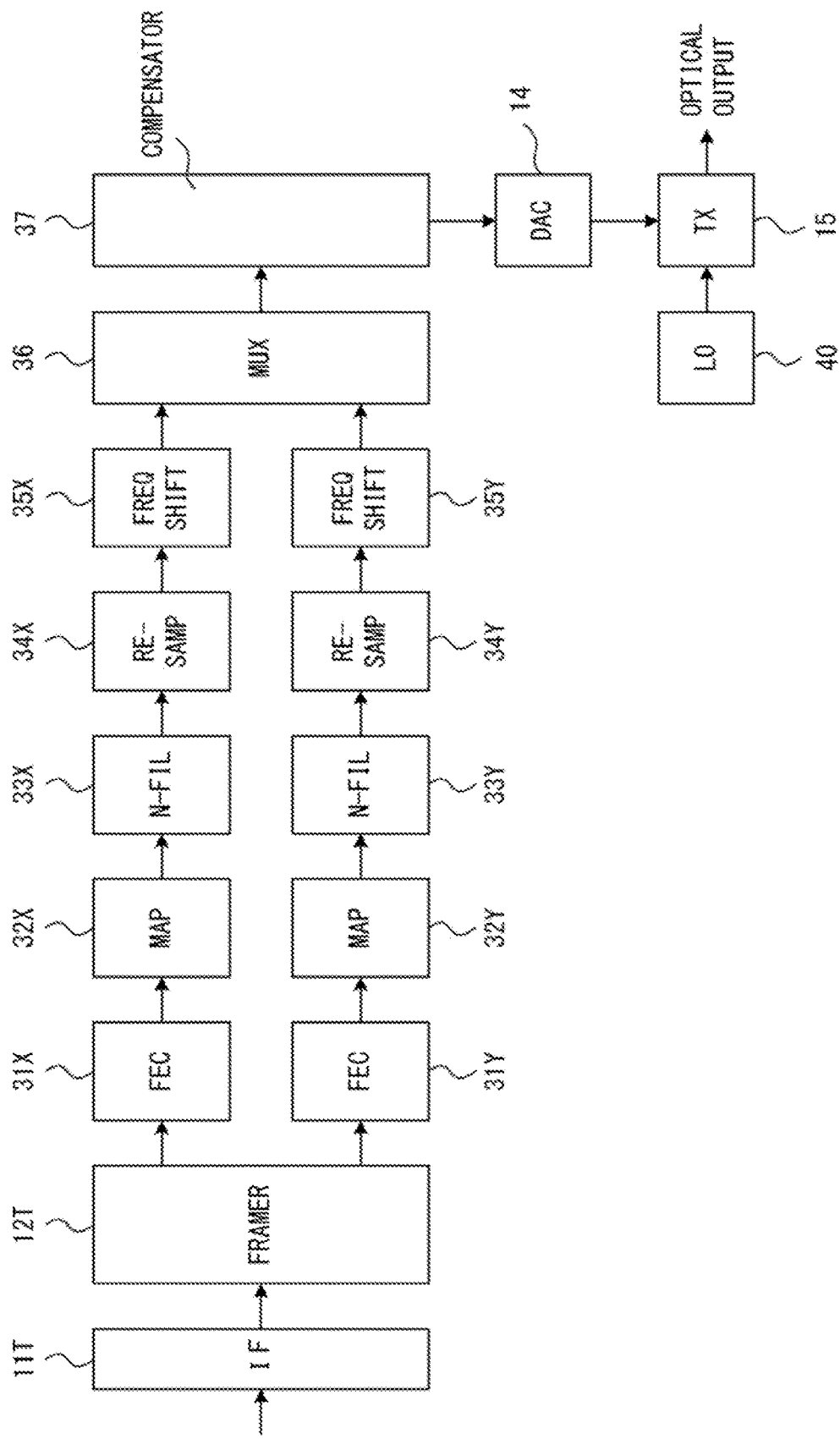
FIG. 6 illustrates an example of a transmitter in a transponder implemented in an optical transmission device.

FIGS. 6-7 illustrate an example of the transponder 10 implemented in the optical transmission device 1. FIG. 6 depicts an example of the transmitter in the transponder 10. FIG. 7 depicts an example of the receiver in the transponder 10. Note that the configuration of the transponder 10 depicted in FIGS. 6-7 is substantially the same as those in the second to fifth embodiments described hereinafter.

As depicted in FIG. 6, the transmitter in the transponder 10 includes an interface (IF) 11T, a framer 12T, FEC encoders 31X and 31Y, mappers (MAP) 32X and 32Y, Nyquist filters (N-FIL) 33X and 33Y, resamplers (RE-SAMP) 34X and 34Y, frequency shifters (FREQ SHIFT) 35X and 35Y, a subcarrier multiplexer (MUX) 36, a transmission-incompleteness compensator 37, a DAC 14, and an optical transmitter 15.

The interface 11T and the framer 12T are respectively portions of the interface 11 and the framer 12 depicted in FIG. 5. A light source (LO) 40 is shared between the transmitter and the receiver. For example, the FEC encoders 31X and 31Y, the mappers 32X and 32Y, the Nyquist filters 33X and 33Y, the resamplers 34X and 34Y, the frequency shifters 35X and 35Y, the subcarrier multiplexer 36, and the transmission-incompleteness compensator 37 may be implemented by the DSP 13 depicted in FIG. 5.

The interface 11T receives a packet output from the packet switch 20. The framer 12T stores a packet received via the interface 11T in a specified frame. In this case, the framer 12T generates a frame X to be transmitted to one adjacent node (hereinafter, "adjacent node #X") and a frame Y to be transmitted to another adjacent node (hereinafter, "adjacent node #Y"). A packet to be transmitted to the adjacent node #X is stored in a frame X, and a packet to be transmitted to the adjacent node #Y is stored in a frame Y.

The FEC encoders 31X and 31Y respectively add error correction codes to the frames X and Y. The mappers 32X and 32Y respectively map bit strings output from the FEC encoders 31X and 31Y to a constellation in accordance with a designated modulation scheme. As a result of the mapping, a transmission signal X to be transmitted to the adjacent node #X and a transmission signal Y to be transmitted to the adjacent node #Y are generated. The Nyquist filters 33X and 33Y respectively perform filtering such that the transmission signals X and Y satisfy a Nyquist condition. The resamplers 34X and 34Y respectively resample output signals of the Nyquist filters 33X and 33Y.

Figure 8A:
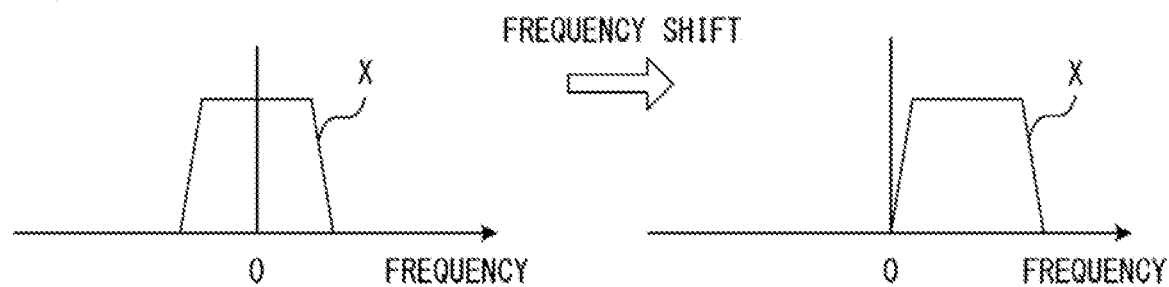
FIGS. 8A-8D are explanatory diagrams for operations of a frequency shifter.
Figure 8B:
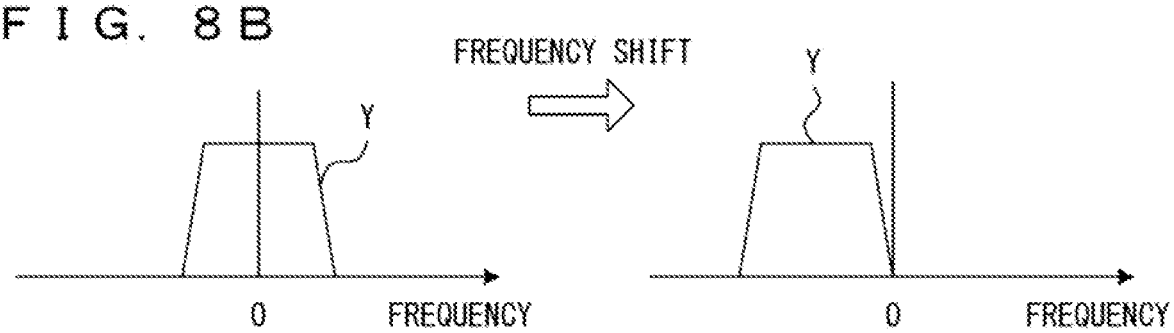

The frequency shifters 35X and 35Y respectively shift the frequencies of the resampled transmission signals X and Y. For example, as depicted in FIG. 8A, the frequency shifter 35X may shift the frequency of a resampled transmission signal X toward the high-frequency side. In this case, the frequency shifter 35X shifts the frequency of the transmission signal X such that, for example, the end portion of the signal band corresponding to the transmission signal X that is located on the low-frequency side is "zero." As depicted in FIG. 8B, the frequency shifter 35Y shifts the frequency of a resampled transmission signal Y toward the low-frequency side. In this case, the frequency shifter 35Y shifts the frequency of the transmission signal Y such that, for example, the end portion of the signal band corresponding to the transmission signal Y that is located on the high-frequency side is "zero." Note that the configurations and operations of the frequency shifters 35X and 35Y are described hereinafter.

Figure 8C:
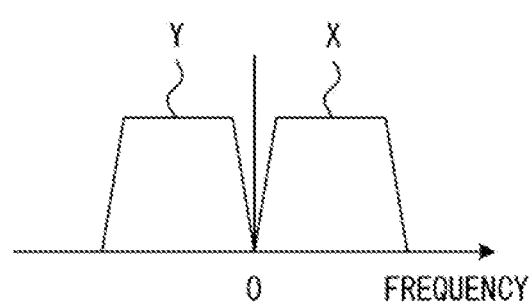

The subcarrier multiplexer 36 multiplexes an output signal of the frequency shifter 35X and an output signal of the frequency shifter 35Y. As a result, the multiplexed signal depicted in FIG. 8C is generated. The transmission-incompleteness compensator 37 performs a process for compensating for incompleteness in the transmitter circuit for an output signal of the subcarrier multiplexer 36. The incompleteness in the transmitter circuit includes, for example, a distortion in an amplifier (not illustrated). The DAC 14 converts an output signal of the transmission-incompleteness compensator 37 into an analog signal so as to generate a drive signal.

Figure 8D:
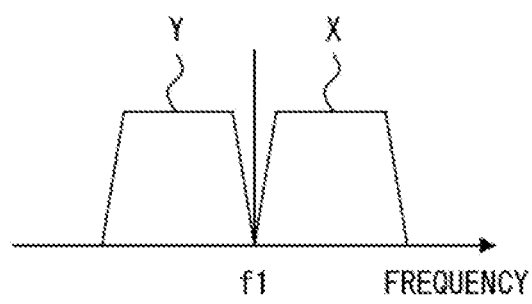

The optical transmitter 15 includes an optical modulator and generates a subcarrier multiplex optical signal by modulating, with a drive signal, continuous wave light generated by the light source 40. In this example, when the frequency of the continuous wave light generated by the light source 40 is f1, a subcarrier multiplex optical signal depicted in FIG. 8D is generated. The subcarrier multiplex optical signal includes a subcarrier optical signal for carrying data to be transmitted to the adjacent node #X and a subcarrier optical signal for carrying data to be transmitted to the adjacent node #Y. The subcarrier multiplex optical signal is split by the optical splitter SLT depicted in FIG. 5 and transmitted to the adjacent nodes #X and #Y.

As depicted in FIG. 7, the receiver in the transponder 10 includes an optical receiver 16, an ADC 17, a dispersion compensator (FEQ) 51, a subcarrier separator (DMUX) 52, frequency shifters 53X and 53Y, resamplers 54X and 54Y, adaptive equalizers (AEQ) 55X and 55Y, frequency offset compensators (OFFSE COMP) 56X and 56Y, phase synchronizers (PHASE SYNC) 57X and 57Y, FEC decoders 58X and 58Y, a framer 12R, and an interface (IF) 11R.

The interface 11R and the framer 12R are respectively portions of the interface 11 and the framer 12 depicted in FIG. 5. The light source (LO) 40 is shared between the transmitter and the receiver. For example, the dispersion compensator 51, the subcarrier separator 52, the frequency shifters 53X and 53Y, the resamplers 54X and 54Y, the adaptive equalizers 55X and 55Y, the frequency offset compensators 56X and 56Y, the phase synchronizers 57X and 57Y, and the FEC decoders 58X and 58Y may be implemented by the DSP 15 depicted in FIG. 5.

The receiver in the transponder 10 receives an optical signal transmitted from the adjacent node #X and an optical signal transmitted from the adjacent node #Y. For example, as indicated in FIG. 4B, the transponder TR implemented in the node #2 depicted in FIG. 2 may receive a subcarrier optical signal (B1+B2) transmitted from the adjacent node #1 and a subcarrier optical signal (B3+B4) transmitted from the adjacent node #3.

The optical receiver 16 is a coherent receiver and generates an electric-field-information signal indicating a received optical signal by using continuous wave light generated by the light source 40. The ADC 17 converts the electric-field-information signal into a digital signal. The dispersion compensator 51 is a fixed equalizer and compensates for dispersion in an optical transmission line. For example, the dispersion compensator 51 may be implemented by a digital filter. The subcarrier separator 52 extracts a subcarrier to be processed by the transponder 10 from an output signal of the dispersion compensator 51. In this case, the subcarrier separator 52 extracts a signal within a frequency range corresponding to the processing capacity of the DSP 13. For example, as indicated in FIG. 4B, the transponder TR implemented in the node #2 depicted in FIG. 2 may extract the subcarriers B2 and B3 among the subcarriers B1-B4. Note that a signal transmitted from the adjacent node #X and extracted by the subcarrier separator 52 may hereinafter be referred to as a "reception signal X." A signal transmitted from the adjacent node #Y and extracted by the subcarrier separator 52 may hereinafter be referred to as a "reception signal Y."

The frequency shifters 53X and 53Y respectively shift the frequencies of the reception signals X and Y. In this case, the frequency shifter 53X performs an operation opposite to the frequency shift implemented by the frequency shifter 35X. The frequency shifter 53Y performs an operation opposite to the frequency shift implemented by the frequency shifter 35Y. The resamplers 54X and 54Y respectively resample output signals of the frequency shifters 53X and 53Y.

The adaptive equalizers 55X and 55Y respectively perform adaptive equalization on output signals of the resamplers 54X and 54Y. For example, the adaptive equalizers 55X and 55Y may be implemented by a digital filter. In this case, the coefficients of the digital filter are adaptively updated in accordance with a reception signal. The frequency offset compensators 56X and 56Y respectively compensate for an offset between the carrier frequency of a received optical signal and the frequency of local oscillation light in the output signals of the adaptive equalizers 55X and 55Y.

The phase synchronizers 57X and 57Y estimate phases of output signals of the frequency offset compensators 56X and 56Y, respectively. In particular, for each symbol, the offset between a phase determined by a source node and the phase of a reception signal is compensated for so as to detect the phase determined by the source node. As a result, for each symbol, one or more bit values are decided, and a bit string indicating a reception signal is recovered. The FEC decoders 58X and 58Y perform error detection and error correction for output signals of the phase synchronizers 57X and 57Y, respectively. As a result, a received frame is recovered.

The framer 12R extracts a packet from a received frame recovered by the DSP 13. The recovered packet is guided to the packet switch 20 via the interface 11R.

FIG. 9 illustrates an example of the frequency shifters 35X, 35Y, 53X, and 53Y. Note that the configurations of the frequency shifters 35X, 35Y, 53X, and 53Y are substantially the same.

The frequency shifter includes an integrator circuit 61 and a rotational operator circuit 62. The frequency shifter is supplied with a function f(t) and an electric-field-information signal. The function f(t) indicates a frequency shift amount. The electric-field-information signal is formed from an I-component signal and a Q-component signal. In the example depicted in FIG. 6, electric-field-information signals to be provided to the frequency shifters 35X and 35Y are output from the resamplers 34X and 34Y. In the example depicted in FIG. 7, electric-field-information signals to be provided to the frequency shifters 53X and 53Y are output from the subcarrier separator 52.

The integrator circuit 61 integrates a frequency shift amount (i.e., f(t)) with respect to time. Then, the integrator circuit 61 outputs the following phase information θ(t) as an integration result.

$$\theta(t) = \int 2\pi f(t) dt$$

The integrator circuit 61 may include a mod 2π circuit. In this case, an output value of the integrator circuit 61 is converted to fall within a range of 0-2π.

The rotational operator circuit 62 corrects an I-component signal and a Q-component signal by using phase information θ(t) through the operations below, where I and Q indicate input signals of the rotational operator circuit 62, and Iout and Qout indicate output signals of the rotational operator circuit 62.

$$Iout = I \cos \theta(t) - Q \sin \theta(t)$$

$$Qout = I \sin \theta(t) + Q \cos \theta(t)$$

Accordingly, the rotational operator circuit 62 controls phases indicated by an I-component signal and a Q-component signal according to a designated frequency shift amount. As a result, the frequencies of the signals are shifted. For example, when increasing a signal frequency as depicted in FIG. 8A, a rotational operation for advancing the phase of an electric-field-information signal may be performed. When decreasing a signal frequency as depicted in FIG. 8B, a rotational operation for delaying the phase of an electric-field-information signal may be performed.

Figure 1:
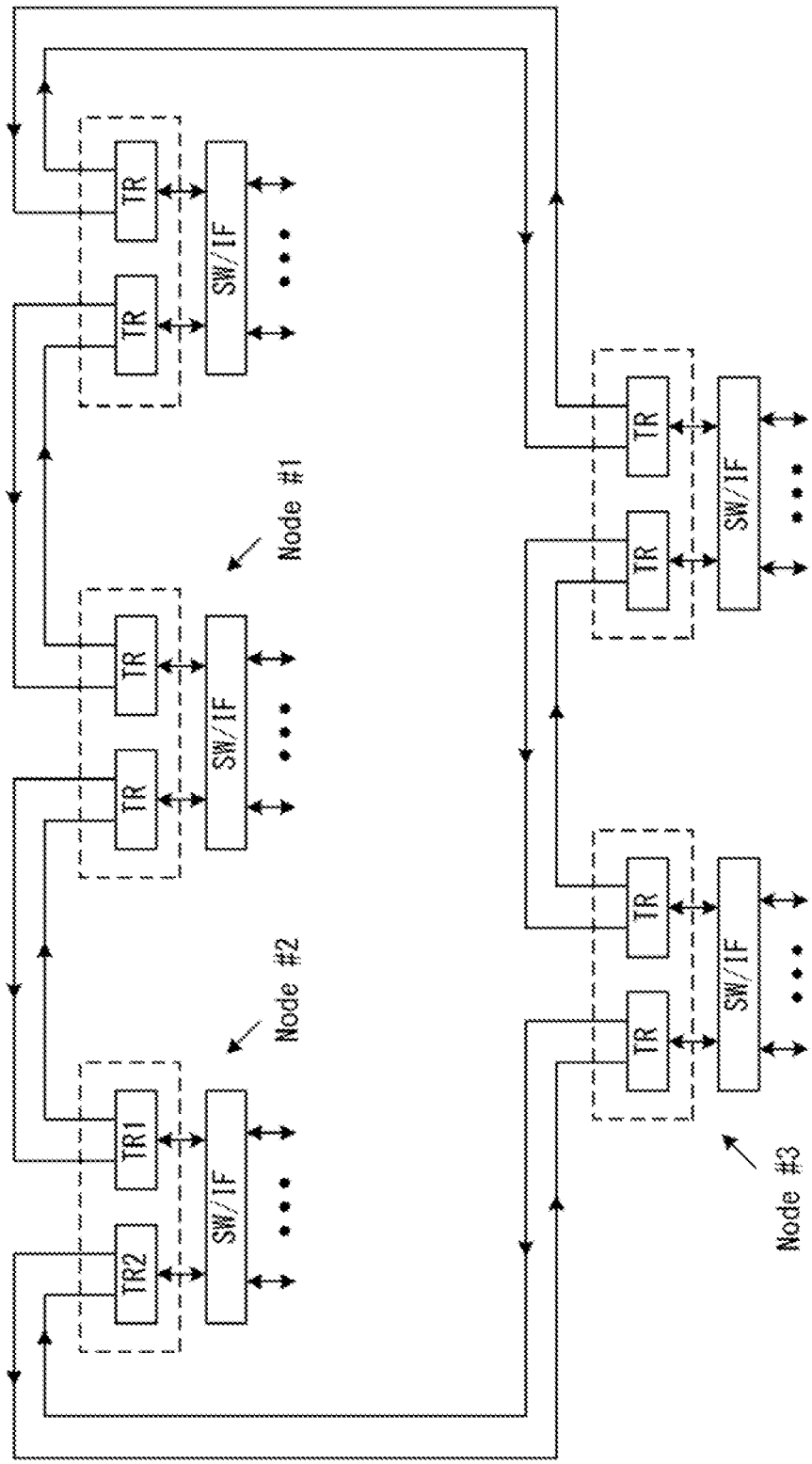
FIG. 1 illustrates an example of a conventional optical communication system.

As described above, in the first embodiment, the optical transmission device 1 implemented in each of the nodes (nodes #1-#4 in FIG. 2) communicates with two nodes adjacent to the node by using one transponder TR. By contrast, the optical communication system depicted in FIG. 1 is such that the optical transmission device implemented in each of the nodes communicates with two nodes adjacent to the node by using two transponders. Thus, the number of transponders implemented in the nodes in the first embodiment is decreased, thereby reducing the costs for the optical transmission devices or the costs for the optical communication system 100.

When the communication capacity of the optical network is small, the optical communication system depicted in FIG. 1 may be incapable of fully using the capabilities of the transponders. By contrast, the first embodiment is such that communication with two adjacent nodes is performed using one transponder TR, so the frequency use efficiency of the transponder tends to be high. Hence, the capabilities of the transponders are fully used.

Figure 10:
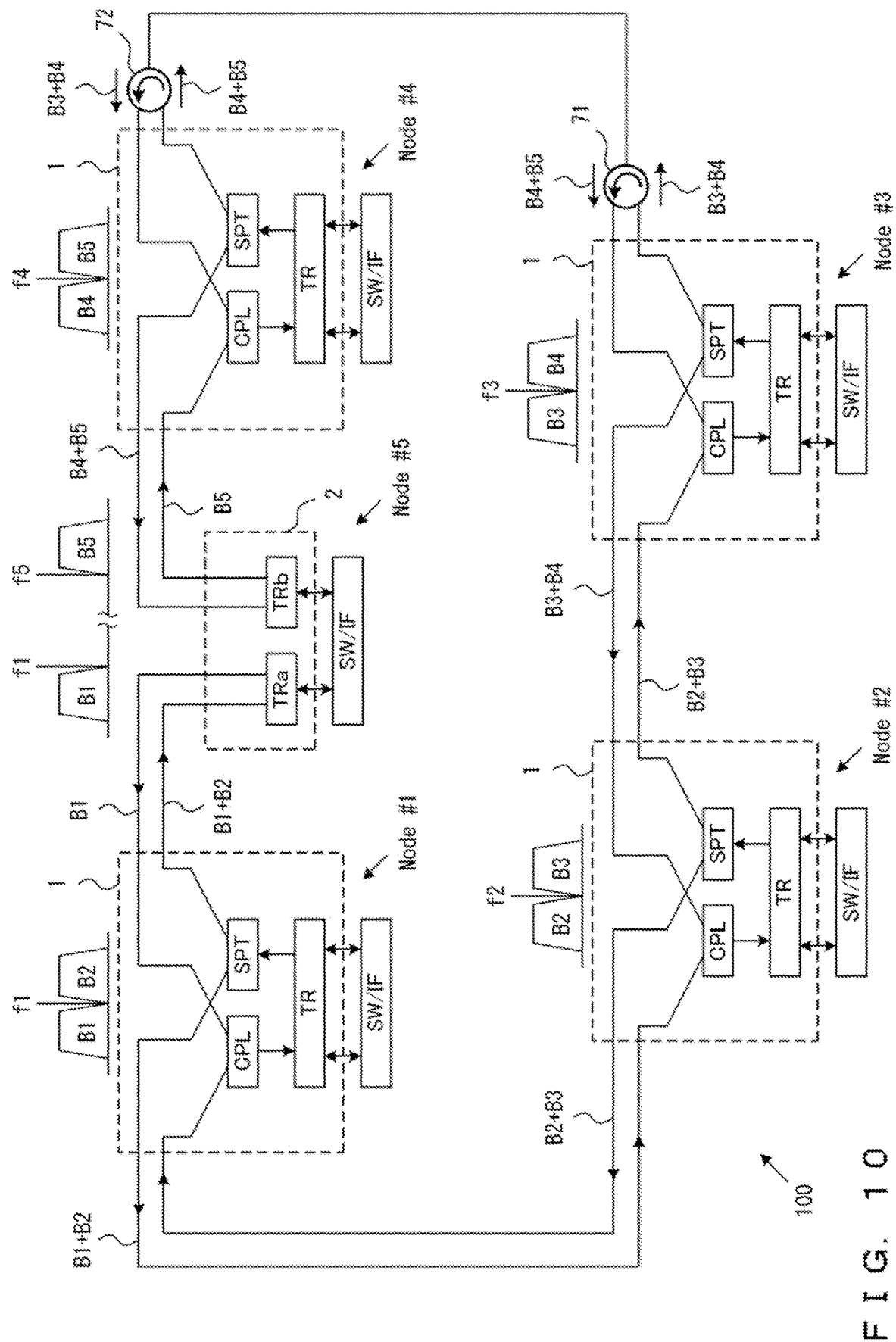
FIG. 10 illustrates a variation of an optical communication system in accordance with a first embodiment.

FIG. 10 illustrates a variation of the optical communication system in accordance with the first embodiment of the invention. In the system depicted in FIG. 2, a bidirectional transmission is implemented in each span by using two optical fibers. However, the present invention is not limited to this configuration. In particular, a bidirectional transmission between nodes may be implemented using one optical fiber. In the example depicted in FIG. 10, the bidirectional transmission is implemented using optical circulators. In particular, an optical circulator 71 guides a subcarrier optical signal B3+B4 output from a node #3 to a node #4 and guides a subcarrier optical signal B4+B5 received from the node #4 to the node #3. Similarly, an optical circulator 72 guides a subcarrier optical signal B4+B5 output from the node #4 to the node #3 and guides a subcarrier optical signal B3+B4 received from the node #3 to the node #4.

Alternatively, optical couplers may be used instead of the optical circulators depicted in FIG. 10, in order to implement a bidirectional transmission between nodes by using one optical fiber. However, using optical circulators will cause smaller optical loss (about 0.6 dB) than using optical couplers.

Second Embodiment

Figure 11:
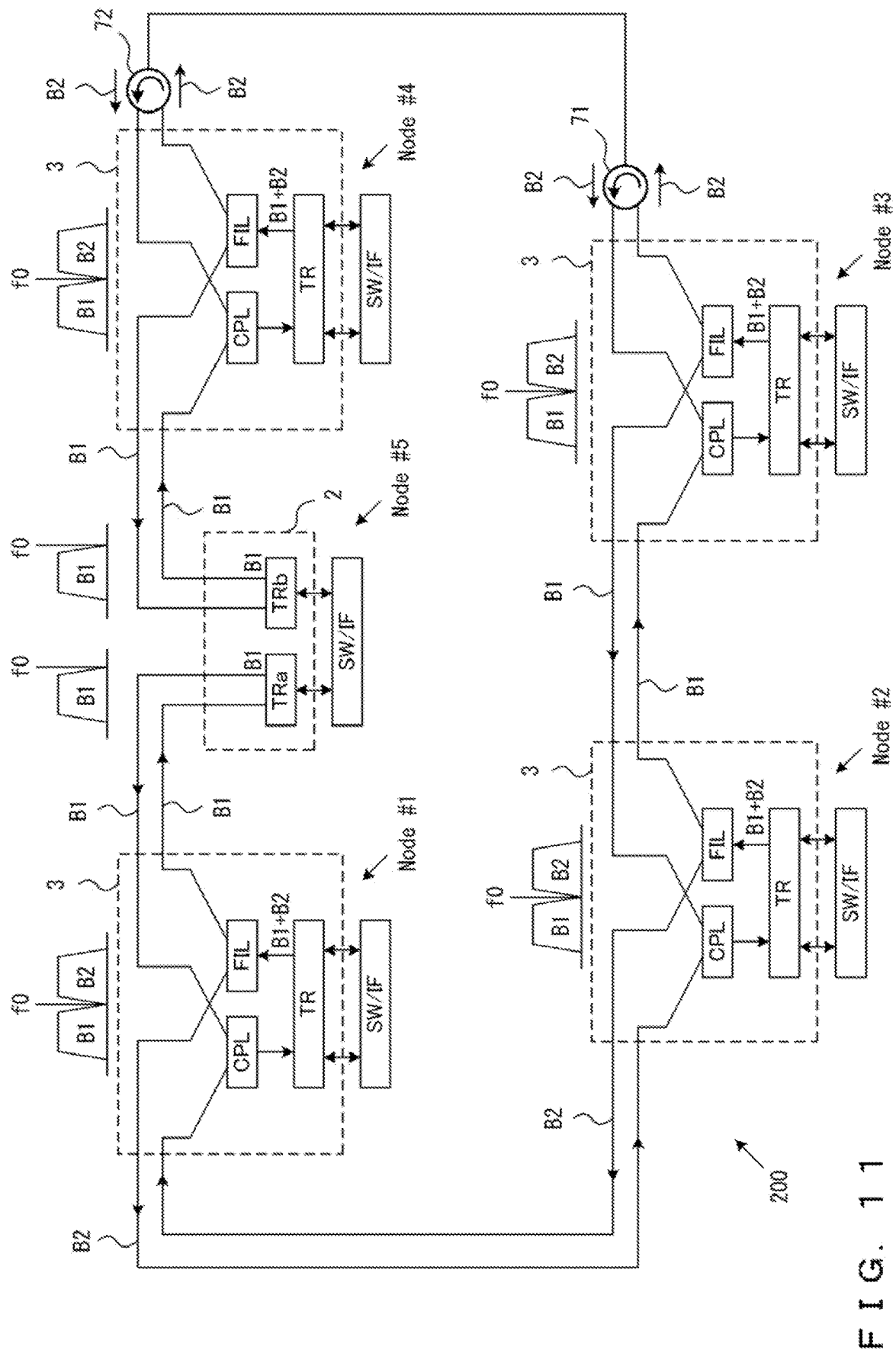
FIG. 11 illustrates an example of an optical communication system in accordance with a second embodiment of the invention.

FIG. 11 illustrates an example of an optical communication system, in accordance with a second embodiment of the invention. As with the optical communication system 100 depicted in FIG. 2, an optical communication system 200 includes nodes #1-#5. The nodes #1-#5 are connected by optical fibers and form an optical ring network. The nodes #1-#4 are each provided with an optical transmission device 3, and the node #5 is provided with an optical transmission device 2. As in the first embodiment, the optical transmission device 2 includes two transponders (TRa, TRb).

The optical transmission device 3 includes a transponder TR, an optical filter FIL, and an optical coupler CPL. The optical transmission device 3 may use, instead of the optical coupler CPL, an optical filter having a coupler function. The optical transmission device 3 may also include other devices that are not depicted in FIG. 11. In addition, a switch circuit SW/IF is connected to the optical transmission device 3. The switch circuit SW/IF in FIG. 2 and that in FIG. 11 are substantially the same.

The nodes #1-#5 in the optical communication system 200 transmit optical signals by using the same carrier frequency. In this example, the carrier frequency is f0.

Each of the nodes #1-#4 can transmit data to nodes adjacent to the node by using a pair of subcarriers. In this example, each of the nodes #1-#4 uses a subcarrier B1 provided on the low-frequency side of the carrier frequency f0 and a subcarrier B2 provided on the high-frequency side of the carrier frequency f0. Thus, the transponder TR in each of the nodes #1-#4 generates a subcarrier optical signal B1 and a subcarrier optical signal B2.

The optical filter FIL separates the two subcarrier optical signals output from the transponder TR from each other. Specifically, the optical filter FIL separates the subcarrier optical signals B1 and B2 from each other. The subcarrier optical signal B1 extracted by the optical filter FIL is guided to one adjacent node, and the subcarrier optical signal B2 extracted by the optical filter FIL is guided to another adjacent node.

In particular, the nodes #1 and #3 respectively transmit subcarrier optical signals B1 in the clockwise direction and transmit subcarrier optical signals B2 in the counterclockwise direction. By contrast, the nodes #2 and #4 respectively transmit subcarrier optical signals B1 in the counterclockwise direction and transmit subcarrier optical signals B2 in the clockwise direction. As a result, in each span, the same subcarrier is used for a transmission in the clockwise direction and a transmission in the counterclockwise direction. For example, optical signals may be bidirectionally transmitted between the nodes #1 and #2 by using the subcarrier B2, and optical signals may be bidirectionally transmitted between the nodes #2 and #3 by using the subcarrier B1.

Each of the nodes #1-#4 recovers data from optical signals received from nodes adjacent to the node. In this case, the optical coupler CPR in each of the nodes #1-#4 combines an optical signal received from one of the adjacent nodes with an optical signal received from the other. Then, according to the combined optical signals, the transponder TR recovers data transmitted from one of the adjacent nodes and data transmitted from the other.

For example, as depicted in FIG. 11, the node #2 may receive a subcarrier optical signal B2 from the node #1 and receive a subcarrier optical signal B1 from the node #3. Then, the subcarrier optical signal B2 and the subcarrier optical signal B1 are combined by the optical coupler CPL. The transponder TR recovers data by means of the receiver depicted in FIG. 7. Specifically, data transmitted from the node #1 is recovered from the subcarrier B2, and data transmitted from the node #3 is recovered from the subcarrier B1.

Similarly, as depicted in FIG. 11, the node #3 receives a subcarrier optical signal B1 from the node #2 and receives a subcarrier optical signal B2 from the node #4. Then, the subcarrier optical signal B1 and the subcarrier optical signal B2 are combined. The transponder TR recovers data by means of the receiver depicted in FIG. 7. Specifically, data transmitted from the node #2 is recovered from the subcarrier B1, and data transmitted from the node #4 is recovered from the subcarrier B2.

As described above, the optical communication system 200 alternately uses subcarriers B1 and B2 in each span. However, the number of nodes forming the optical ring network is an odd number. Hence, one of the nodes #1-#5 will use the same subcarrier for communication with one adjacent node and for communication with the other adjacent node. In this example, the node #5 uses a subcarrier B1 for communication with the node #1 and also uses a subcarrier B1 for communication with the node #4. In this case, the node #5 uses the same subcarriers, i.e., the subcarriers overlap. Accordingly, the optical transmission device 2 provided with two transponders (TRa, TRb) is implemented in the node #5.

The transponder TRa generates a subcarrier signal B1 by allocating a subcarrier B1 to data to be transmitted to the node #1. The subcarrier signal B1 generated by the transponder TRa is transmitted to the node #1. The transponder TRb generates a subcarrier signal B1 by allocating a subcarrier B1 to data to be transmitted to the node #4. The subcarrier signal B1 generated by the transponder TRb is transmitted to the node #4.

The transponder TRa recovers data from a subcarrier signal B1 transmitted from the node #1. The transponder TRb recovers data from a subcarrier signal B1 transmitted from the node #4.

As described above, also in the second embodiment, the optical transmission device 3 implemented in each of the nodes (nodes #1-#4 in FIG. 11) communicates with two nodes adjacent to the node by using one transponder TR. Thus, in comparison with the configuration depicted in FIG. 1, the number of transponders implemented in the nodes in the second embodiment is decreased, thereby reducing the costs for the optical transmission devices and/or the optical communication system. In addition, as with the first embodiment, the second embodiment is such that each node communicates with two nodes adjacent to the node by using one transponder TR, so the frequency use efficiency of the transponder tends to be high. Hence, the capabilities of the transponders are fully used.

In the meantime, the optical transmission device 3 in the second embodiment uses the optical filter FIL, instead of the optical splitter SLT used in the first embodiment indicated in FIG. 2. The optical filter may be expensive in comparison with the optical splitter. Thus, the first embodiment may require lower costs for the optical transmission device than the second embodiment.

However, the first embodiment needs as many subcarriers as the number of nodes that form the optical ring network. In the example depicted in FIG. 2, five subcarriers B1-B5 are used in the optical ring network that includes the five nodes #1-#5. In the meantime, optical fiber communication is implemented using limited resources (e.g., C band). Accordingly, an upper limit may be determined for the number of nodes that form the optical ring network in the first embodiment. Alternatively, the bandwidth of the subcarriers may be limited. By contrast, the second embodiment needs two subcarriers, irrespective of the number of nodes that form the optical ring network. Accordingly, an upper limit is not necessary for the number of nodes that form the optical ring network in the second embodiment. Furthermore, the bandwidth of the subcarriers is not limited.

The transponder in the optical transmission device 3 used in the second embodiment is also implemented using the configurations depicted in FIGS. 6-7. The optical transmission device 3 may use, instead of the optical coupler CPL that combines two received optical signals, an optical filter circuit having a coupler function. In this case, the optical filter circuit may include a filter for extracting a subcarrier B1 and a filter for extracting a subcarrier B2.

In the example depicted in FIG. 11, the number of nodes forming the optical ring network is an odd number. Accordingly, one of the nodes #1-#5 is provided with an optical transmission device that includes two transponders. However, in a case where the number of nodes forming the optical ring network is an even number, all of the nodes may be provided with optical transmission devices 3.

Third Embodiment

Figure 12:
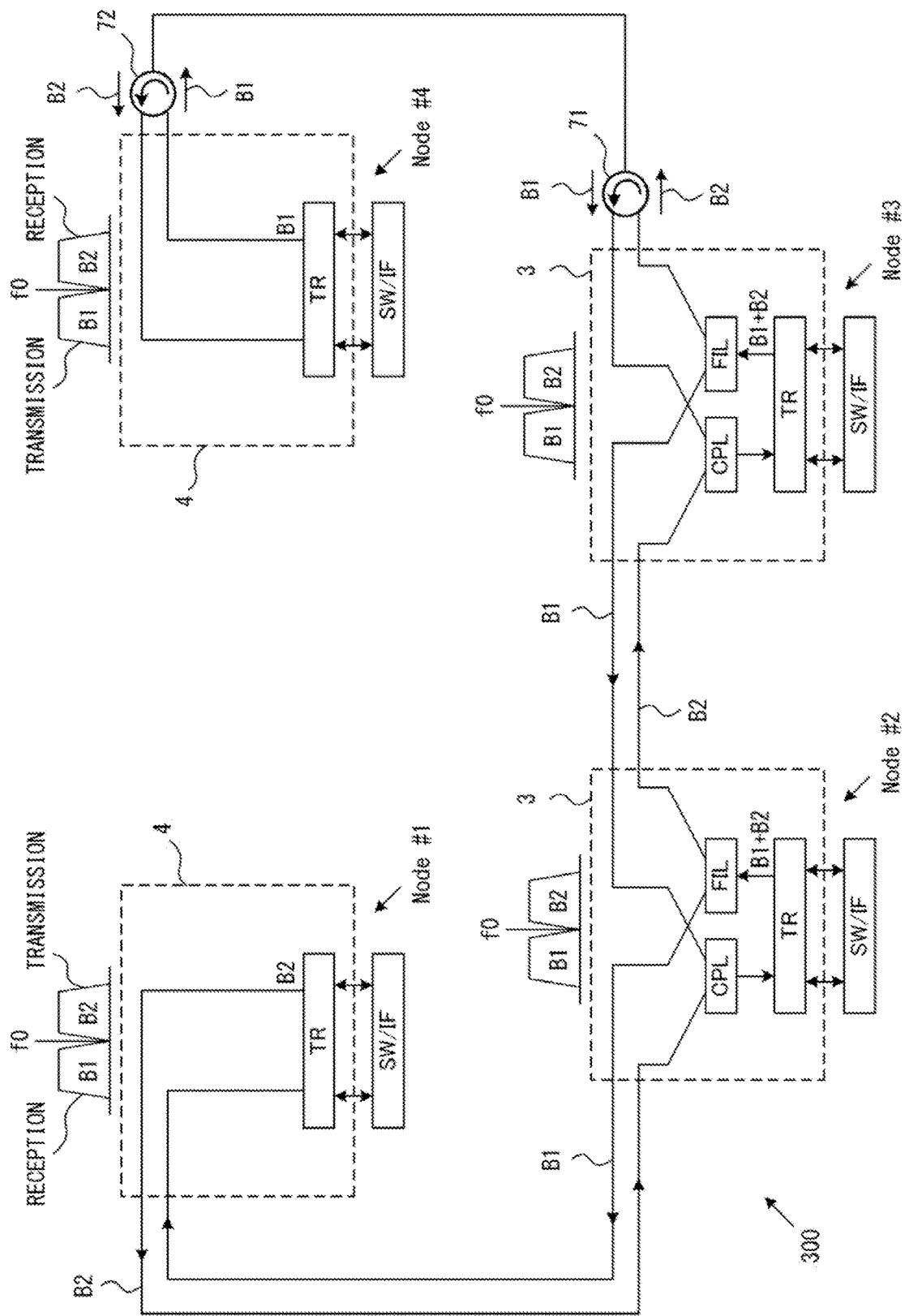
FIG. 12 illustrates an example of an optical communication system in accordance with a third embodiment of the invention.

FIG. 12 illustrates an example of an optical communication system in accordance with a third embodiment of the invention. An optical communication system 300 in accordance with the third embodiment includes nodes #1-#4. The nodes #1-#4 are connected by optical fibers and form an optical linear network. The nodes #2-#3 are each provided with an optical transmission device 3, and the nodes #1 and #4 are each provided with an optical transmission device 4.

The configuration and operations of the optical transmission device 3 in the third embodiment are substantially the same as those in the second embodiment. Thus, the optical transmission device 3 processes two subcarrier optical signals by using one transponder TR. However, each of the optical transmission devices 3 in the third embodiment transmits a subcarrier optical signal B1 in the direction from the node #4 toward the node #1 and transmits a subcarrier optical signal B2 in the direction from the node #1 toward the node #4.

The optical transmission device 4 includes one transponder TR. The optical transmission device 4 transmits either a subcarrier optical signal B1 or B2 and receives the other. In this example, the optical transmission device 4 implemented in the node #1 transmits a subcarrier optical signal B2 and receives a subcarrier optical signal B1. The optical transmission device 4 implemented in the node #4 transmits a subcarrier optical signal B1 and receives a subcarrier optical signal B2.

As described above, the optical communication system 300 uses a subcarrier B2 for a transmission from the node #1 toward the node #4 and uses a subcarrier B1 for a transmission from the node #4 toward the node #1. Each of the optical transmission devices implemented in the nodes other than those provided at the ends of the optical linear network (i.e., the optical transmission devices 3 implemented in the nodes #2 and #3) communicates with two nodes adjacent to the node by using one transponder TR. Thus, the number of transponders implemented in the nodes in the third embodiment is decreased, thereby reducing the costs for the optical transmission devices and/or the optical communication system. In addition, as with the first and second embodiments, the third embodiment is such that each node communicates with two nodes adjacent to the node by using one transponder TR, so the frequency use efficiency of the transponder tends to be high. Hence, the capabilities of the transponders are fully used.

Fourth Embodiment

Figure 13:
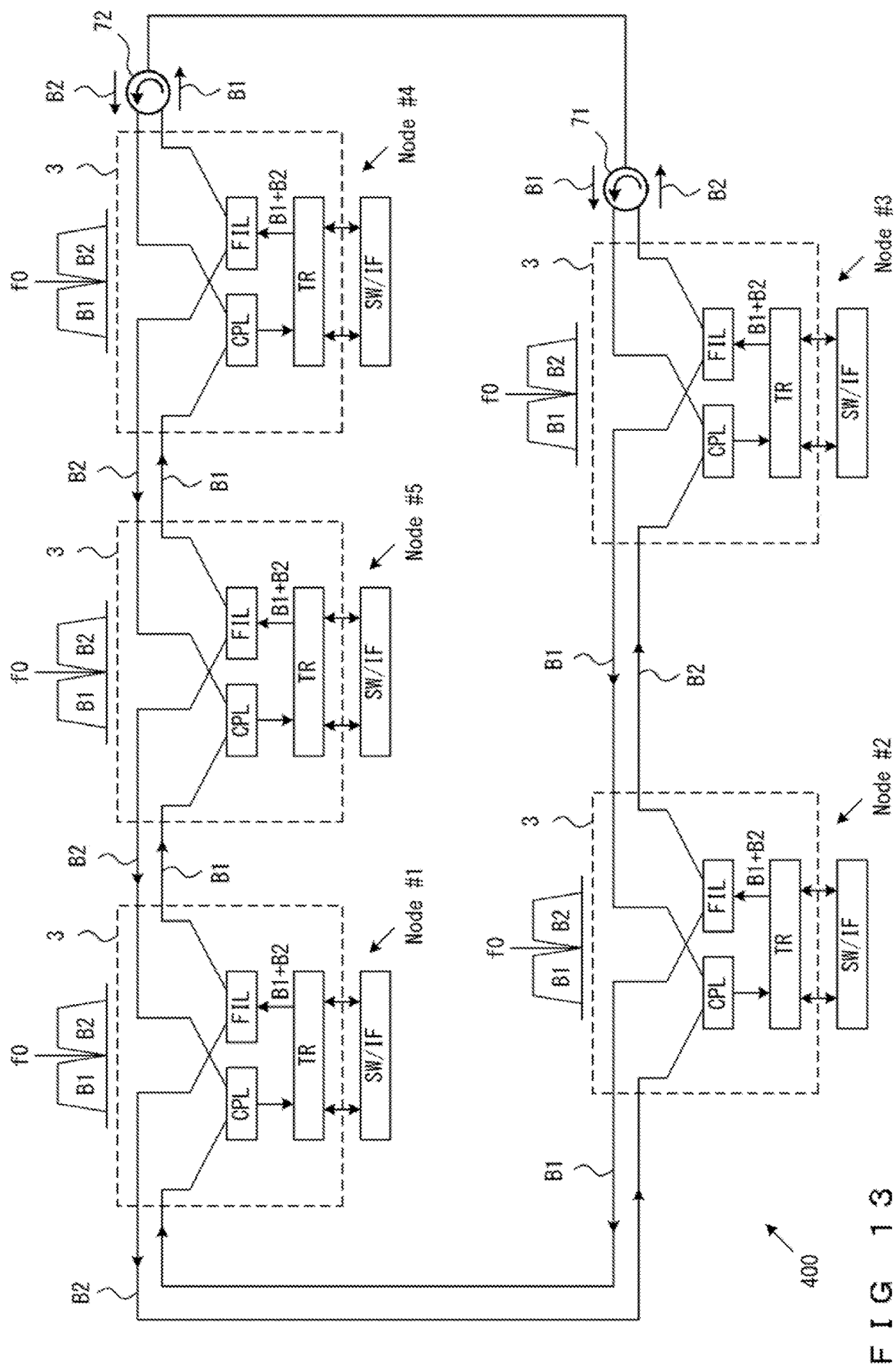
FIG. 13 illustrates an example of an optical communication system in accordance with a fourth embodiment of the invention.

FIG. 13 illustrates an example of an optical communication system in accordance with a fourth embodiment of the invention. As with the optical communication system 100 depicted in FIG. 2, an optical communication system 400 includes nodes #1-#5. The nodes #1-#5 are connected by optical fibers and form an optical ring network. The nodes #1-#5 are each provided with an optical transmission device 3. That is, every node is provided with the same optical transmission device. In addition, the oscillation frequencies of the local oscillation light sources in the nodes are synchronous with each other. In this example, the local oscillation light sources in the nodes have an oscillation frequency of f0.

The configuration and operations of the optical transmission device 3 in the fourth embodiment are substantially the same as those in the second embodiment. In particular, the optical transmission device 3 includes the transponder depicted in FIGS. 6-7, the optical filter FIL, and the optical coupler CPL. As in the second embodiment, the optical coupler CPL may be an optical filter having a coupler function. The optical transmission device 3 transmits two subcarrier optical signals and receives two subcarrier optical signals.

Specifically, the transponder TR generates a subcarrier optical signal B1 by allocating a subcarrier B1 to data to be transmitted in the clockwise direction and generates a subcarrier optical signal B2 by allocating a subcarrier B2 to data to be transmitted in the counterclockwise direction. The optical filter FIL separates the subcarrier optical signals B1 and B2 from each other. Then, the subcarrier optical signal B1 is transmitted in an adjacent node in the clockwise direction, and the subcarrier optical signal B2 is transmitted to an adjacent node in the counterclockwise direction.

The optical transmission device 3 receives a subcarrier optical signal B1 from one adjacent node and receives a subcarrier optical signal B2 from another adjacent node. The subcarrier optical signals B1 and B2 are combined by the optical coupler CPL and guided to the transponder TR. The transponder TR recovers data from each of the subcarrier optical signals B1 and B2.

As described above, in the fourth embodiment, one (subcarrier B1 in FIG. 13) of two subcarriers is used for a transmission in the clockwise direction, and the other subcarrier (subcarrier B2 in FIG. 13) is used for a transmission in the counterclockwise direction. The optical transmission device provided in each of the nodes communicates with two nodes adjacent to the node by using one transponder TR. Thus, the number of transponders implemented in the nodes in the fourth embodiment is decreased, thereby reducing the costs for the optical transmission devices and/or the optical communication system. In addition, as with the first to third embodiments, the fourth embodiment is such that each node communicates with two nodes adjacent to the node by using one transponder TR, so the frequency use efficiency of the transponder tends to be high. Hence, the capabilities of the transponders are fully used.

For example, the optical filter FIL may be implemented by a cyclic filter (interleaver) depicted in FIG. 14. The transmittance of the cyclic filter periodically changes with respect to frequency. For example, the cyclic filter may be designed such that the cycle on which the transmittance changes is the same as or almost the same as the bandwidth of one subcarrier. In addition, the cyclic filter includes two optical output ports. In this case, rays of output light in odd-numbered passbands (F1, F3, . . . ) are guided to one of the optical output ports, and rays of output light in even-numbered passbands (F2, F4, . . . ) are guided to the other optical output port. The cyclic filter is also designed such that the center frequencies of the subcarriers B1 and B2 each coincide with the center frequency of a corresponding passband. In the example depicted in FIG. 14, the center frequencies of the subcarriers B1 and B2 are respectively designed to coincide with the center frequencies of the passbands F2 and F3.

As described above, also in the fourth embodiment, the optical transmission device 3 implemented in each of the nodes communicates with two nodes adjacent to the node by using one transponder TR. Thus, in comparison with the configuration depicted in FIG. 1, the number of transponders implemented in the nodes in the fourth embodiment is decreased, thereby reducing the costs for the optical transmission devices and/or the optical communication system. In addition, as with the first embodiment, the fourth embodiment is such that each node communicates with two nodes adjacent to the node by using one transponder TR, so the frequency use efficiency of the transponder tends to be high. Hence, the capabilities of the transponders are fully used.

Fifth Embodiment

An optical communication system 500 in a fifth embodiment as such that, as in the fourth embodiment, one (e.g., subcarrier B1) of two subcarriers is used for a transmission in the clockwise direction, and the other subcarrier (e.g., subcarrier B2) is used for a transmission in the counterclockwise direction. However, in the fifth embodiment, one or more nodes are each provided with an optical transmission device 1, and the other nodes are each provided with an optical transmission device 5. In the example depicted in FIG. 15, nodes #1 and #3 are each provided with an optical transmission device 1, and nodes #2, #4, and #5 are each provided with an optical transmission device 5.

As described above by referring to the first embodiment, the optical transmission device 1 includes a transponder TR, an optical splitter SPT, and an optical coupler CPL. Thus, an optical subcarrier signal B1+B2 output from the transponder TR is split by the optical splitter SPT. Then, the optical subcarrier signal B1+B2 is transmitted in the clockwise direction and the counterclockwise direction. For example, an optical subcarrier signal B1+B2 may be transmitted from the node #1 to the nodes #2 and #5. Similarly, an optical subcarrier signal B1+B2 may be transmitted from the node #3 to the nodes #2 and #4.

The optical transmission device 5 includes a transponder TR, an optical filter FIL, and an optical filter FIL_R. The optical filter FIL_R includes two optical input ports. A filter connected to one of the optical input ports extracts a subcarrier B1, and a filter connected to the other of the optical input ports extracts a subcarrier B2. That is, the optical transmission device 5 uses the optical filter FIL_R so as to extract designated subcarriers from received optical signals.

For example, the node #2 may receive a subcarrier optical signal B1+B2 from the node #1 and also receive an optical subcarrier signal B1+B2 from the node #3. In this example, data to be transmitted from the node #1 to the node #2 is allocated to a subcarrier B2. Thus, the optical transmission device 5 provided in the node #2 uses the optical filter FIL_R so as to extract an optical subcarrier signal B2 from an optical signal transmitted from the node #1. Meanwhile, data to be transmitted from the node #3 to the node #2 is allocated to a subcarrier B1. Thus, the optical transmission device 5 provided in the node #2 uses the optical filter FIL_R so as to extract an optical subcarrier signal B1 from an optical signal transmitted from the node #3. This configuration allows for avoidance of overlap of subcarriers in the node #2.

As described above, the optical transmission device 5 can avoid overlap of subcarriers. In other words, nodes adjacent to a node provided with an optical transmission device 1 need to be provided with optical transmission devices 5 in order to avoid overlap of subcarriers in the optical network. In this regard, the optical transmission device 1 that does not include an optical filter for extracting a corresponding subcarrier from a transmission optical signal is inexpensive in comparison with the optical transmission device that includes the optical filter. Thus, the configuration of the fifth embodiment, in which both optical transmission devices 1 and optical transmission devices 5 are implemented, can be attained with low costs in comparison with the fourth embodiment.

Another Embodiment

Figure 16:
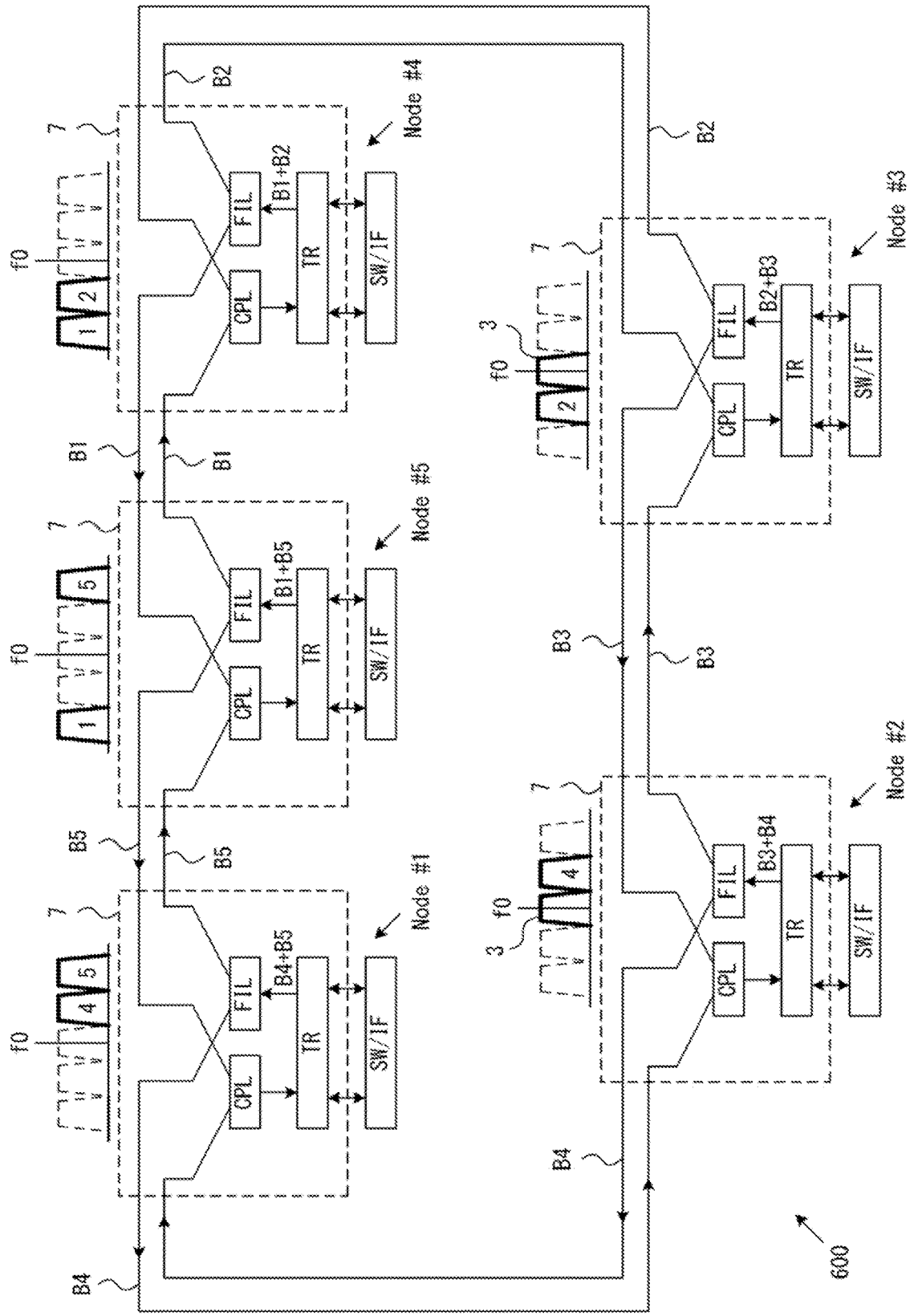
FIG. 16 illustrates an example of an optical communication system in accordance with another embodiment.

FIG. 16 illustrates an example of an optical communication system in accordance with another embodiment. As with the optical communication system 100 depicted in FIG. 2, an optical communication system 600 includes nodes #1-#5. The nodes are connected by optical fibers and form an optical ring network. The nodes #1-#5 are each provided with an optical transmission device 7. In addition, the oscillation frequencies of the local oscillation light sources in the nodes are the same.

The communication bandwidth of the optical transmission devices 7 in the optical communication system 600 are divided into as many divisions as the number of nodes that form an optical ring network. In this example, the optical ring network includes five nodes #1-#5. Thus, the communication bandwidth used by the optical transmission devices 7 is divided into five subcarriers B1-B5. The optical transmission devices 7 each communicate with adjacent nodes by using two of the five subcarriers B1-B5. In this case, subcarriers to be allocated to the nodes are determined such that reception subcarriers do not overlap each other in any of the nodes.

Using the optical filter FIL, the transponder TR in each of the nodes separates two subcarriers allocated to the nodes from each other. The optical transmission device 7 transmits one of the subcarrier optical signals in the clockwise direction and transmits the other in the counterclockwise direction. Each of the nodes combines subcarrier optical signals received from nodes adjacent to the node. The transponder TR recovers a pair of pieces of data from the combined optical signals.

For example, the subcarriers B4 and B5 may be allocated to the node #1, the subcarriers B3 and B4 may be allocated to the node #2, and the subcarriers B2 and B3 may be allocated to the node #3. The node #1 transmits a subcarrier optical signal B5 to the node #5 and transmits a subcarrier optical signal B4 to the node #2. The node #3 transmits a subcarrier optical signal B3 to the node #2 and transmits a subcarrier optical signal B2 to the node #4. Thus, the node #2 receives the subcarrier optical signal B4 from the node #1 and receives the subcarrier optical signal B3 from the node #3.

Accordingly, bidirectional transmissions using a plurality of subcarriers are also implemented in the optical communication system 600 in accordance with the other embodiment. However, the first, second, fourth, and fifth embodiments attain more advantageous effects than the other embodiment depicted in FIG. 16.

Figure 17A:
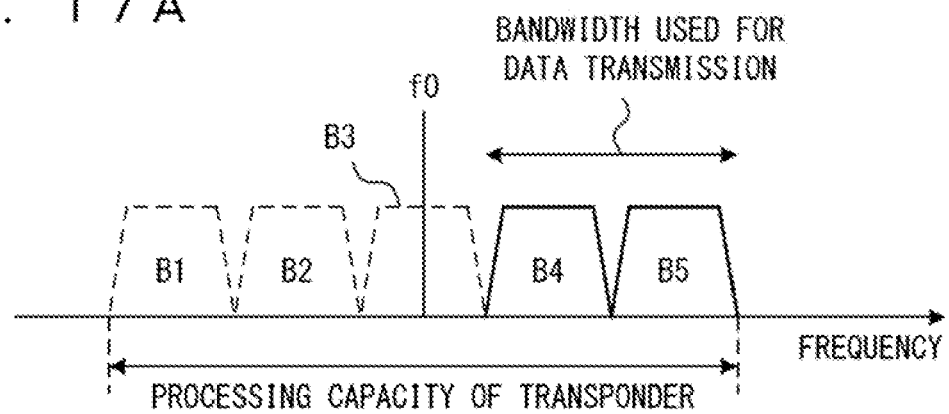
FIGS. 17A-17C illustrate effects of embodiments of the invention.

When the optical ring network in the other embodiment illustrated in FIG. 16 includes N nodes, the optical transmission devices 7 each perform communication using two designated subcarriers among N subcarriers. In this regard, the optical transmission devices 7 provided in the nodes being the same in configuration requires that the optical transmission devices 7 be capable of providing N subcarriers. For example, when the optical ring network includes five nodes #1-#5, the optical transmission device 7 may be configured to provide subcarriers B1-B5, as depicted in FIG. 17A. However, the number of subcarriers to be used to transmit signals is two. Thus, the spectrum use efficiency in the other embodiment depicted in FIG. 16 is low. For example, when the communication bandwidth of the optical transmission device 7 is 800 Gbps, the bandwidth to be used to transmit data may be 320 Gbps.

Figure 17B:
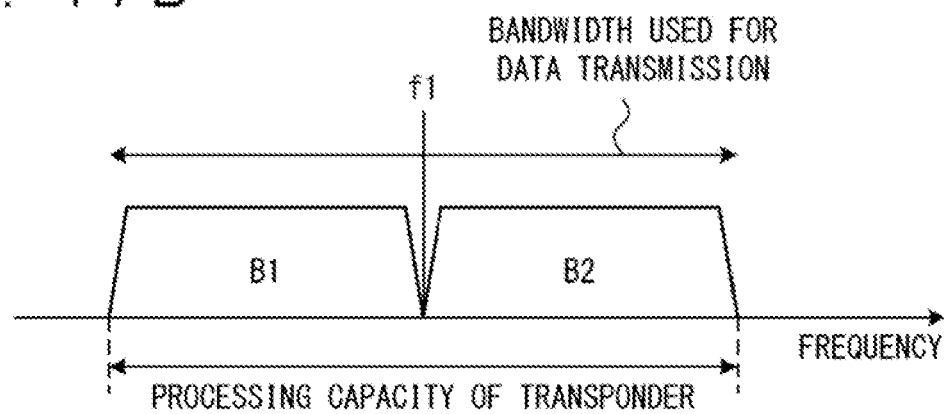
Figure 17C:
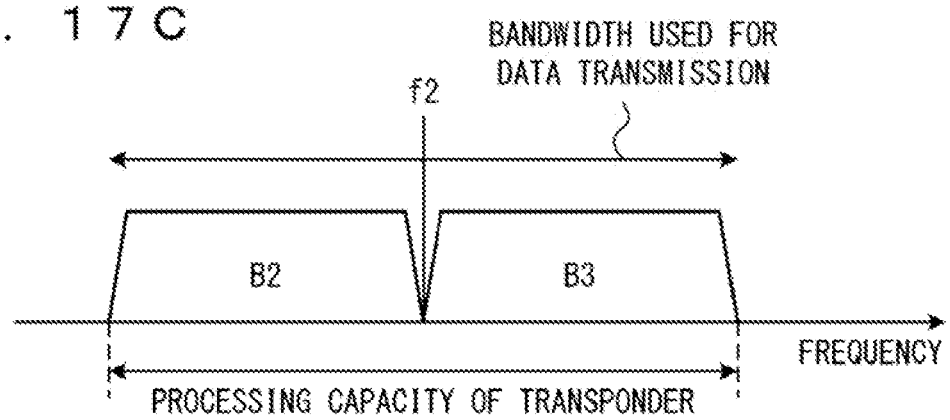

By contrast, different carrier frequencies are allocated to the nodes in the first embodiment depicted in FIG. 2. The optical transmission device 1 provided in each of the nodes performs communication using two respective subcarriers that are provided on the low-frequency side and the high-frequency side of the allocated carrier frequency and adjacent to this subcarrier frequency. Thus, the first embodiment is such that communication is performed using two subcarriers adjacent to an allocated carrier frequency, irrespective of the number of nodes that form the optical ring network. For example, the node #1 depicted in FIG. 2 may transmit a signal by using the subcarriers B1 and B2 adjacent to the frequency f1 as indicated in FIG. 17B, and the node #2 may transmit a signal by using the subcarriers B2 and B3 adjacent to the frequency f2 as indicated in FIG. 17C. For example, when the communication bandwidth of the optical transmission device 7 is 800 Gbps, the bandwidth to be used to transmit data may also be 800 Gbps. That is, communication can be performed using the entirety of the communication bandwidth of the optical transmission device 1. Thus, the first embodiment attains a higher spectrum use efficiency than the other embodiment depicted in FIG. 16. In addition, the optical transmission device in the first embodiment transmits a transmission optical signal to two adjacent nodes by using the inexpensive optical splitter SPT, so that the costs for the optical transmission device can be reduced.

Figure 15:
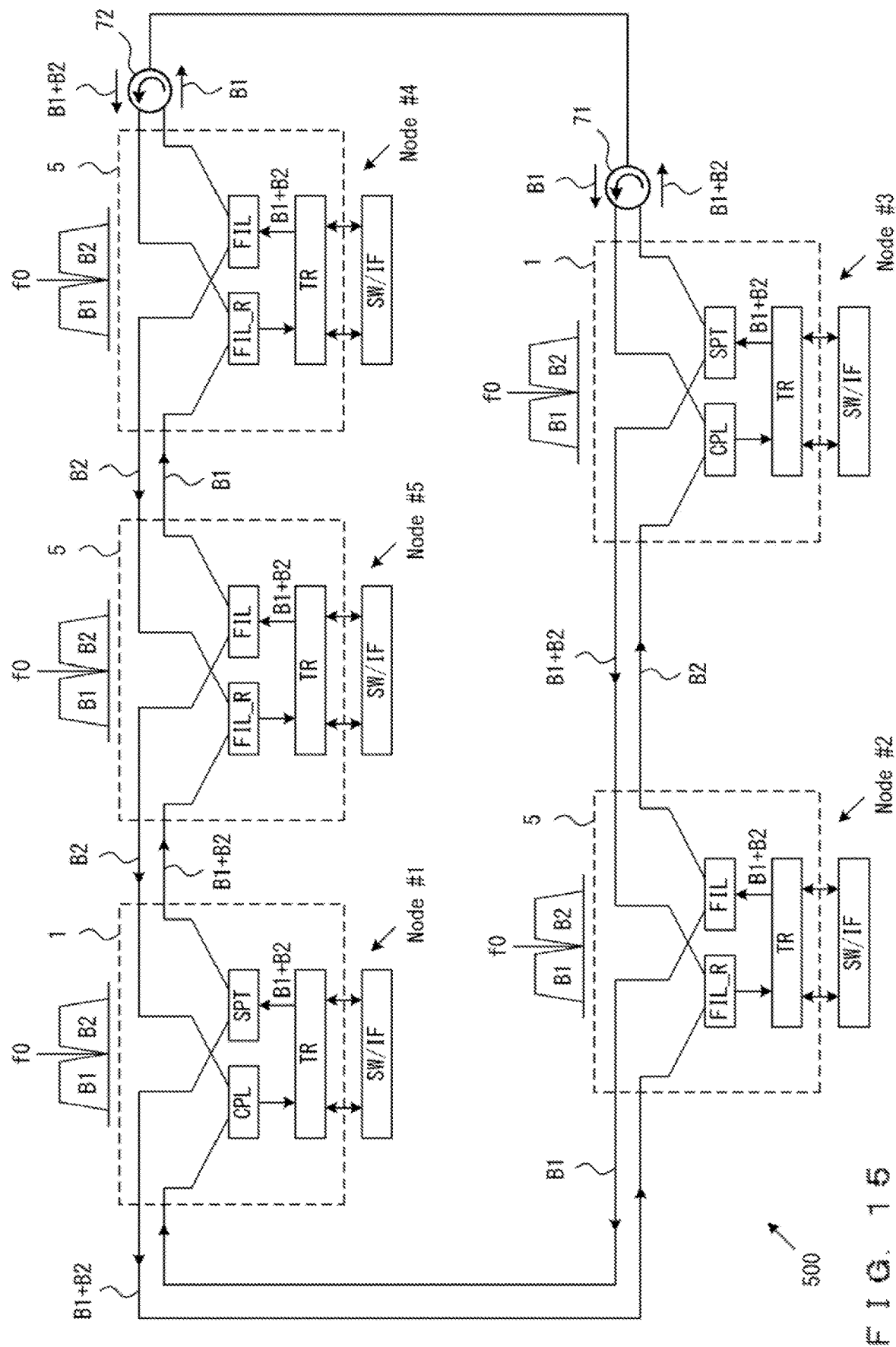
FIG. 15 illustrates an example of an optical communication system in accordance with a fifth embodiment of the invention.

In the second embodiment depicted in FIG. 11, the fourth embodiment depicted in FIG. 13, and the fifth embodiment depicted in FIG. 15, communication is performed, as in the first embodiment, by using two respective subcarriers that are provided on the low-frequency side and the high-frequency side of a carrier frequency and adjacent to this subcarrier frequency. Thus, the spectrum use efficiency is high.

Furthermore, the nodes in the other embodiment depicted in FIG. 16 each include an optical filter FIL for splitting a transmission optical signal, and the optical filters FIL have different configurations. For example, an optical filter for extracting subcarriers B4 and B5 may be implemented in the node #1, and an optical filter for extracting subcarriers B3 and B4 may be implemented in the node #2. By contrast, the optical filters FIL provided in the nodes in the second and fourth embodiments so as to split transmission optical signals are the same in configuration. Thus, the costs for the optical transmission devices are reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device provided in a first node among a plurality of nodes included in an optical network, different carrier frequencies being respectively allocated to the plurality of nodes, the optical transmission device comprising:
    a first light source configured to generate local oscillation light of a first carrier frequency that is allocated to the first node;
    a transmitter configured to generate, by using the local oscillation light, a first subcarrier optical signal with a first subcarrier established on a low-frequency side of the first carrier frequency and a second subcarrier optical signal with a second subcarrier established on a high-frequency side of the first carrier frequency;
    an optical splitter configured to split an optical signal including the first subcarrier optical signal and the second subcarrier optical signal to generate a first optical signal to be transmitted to a first adjacent node and a second optical signal to be transmitted to a second adjacent node;
    an optical coupler configured to combine an optical signal received from the first adjacent node and an optical signal received from the second adjacent node; and
    a receiver configured to recover, by using the local oscillation light, a first reception signal carried by the first subcarrier and a second reception signal carried by the second subcarrier from an output optical signal of the optical coupler, wherein
    a difference between a frequency of the first light source and a frequency of a light source implemented in the first adjacent node corresponds to a bandwidth of the first subcarrier.

2. The optical transmission device according to claim 1, wherein
    a difference between the first carrier frequency and a carrier frequency allocated to the first adjacent node is the same as the bandwidth of the first subcarrier, and a difference between the first carrier frequency and a carrier frequency allocated to the second adjacent node is the same as a bandwidth of the second subcarrier.

3. The optical transmission device according to claim 1, wherein
    the bandwidth of the first subcarrier and a bandwidth of the second subcarrier are the same, and
    the first subcarrier is established on the low-frequency side of the first carrier frequency and adjacent to the first carrier frequency, and the second subcarrier is established on the high-frequency side of the first carrier frequency and adjacent to the first carrier frequency.

4. The optical transmission device according to claim 3, wherein
    the bandwidth of the first subcarrier and the bandwidth of the second subcarrier are each half of a maximum communication bandwidth of an optical transceiver that includes the transmitter and the receiver.

5. An optical transmission device provided in a first node among a plurality of nodes included in an optical network, the optical transmission device comprising:

a transmitter configured to generate a first subcarrier optical signal by using a first subcarrier established on a low-frequency side of a specified carrier frequency and generate a second subcarrier optical signal by using a second subcarrier established on a high-frequency side of the carrier frequency;

an optical filter configured to extract the first subcarrier optical signal from output light of the transmitter and guide the extracted first subcarrier optical signal to a first adjacent node and extract the second subcarrier optical signal from the output light of the transmitter and guide the extracted second subcarrier optical signal to a second adjacent node;

an optical coupler configured to combine an optical signal received from the first adjacent node and an optical signal received from the second adjacent node; and a receiver configured to recover a first reception signal carried by the first subcarrier and a second reception signal carried by the second subcarrier from an output optical signal of the optical coupler.

6. The optical transmission device according to claim 5, wherein the first reception signal includes data transmitted from the first adjacent node, and the second reception signal includes data transmitted front the second adjacent node.

7. The optical transmission device according to claim 5, wherein the first reception signal includes data transmitted from the second adjacent node, and the second reception signal includes data transmitted from the first adjacent node.

8. An optical transmission method that is used by an optical transmission device provided in a first node among a plurality of nodes included in an optical network, different carrier frequencies being respectively allocated to the plurality of nodes, the optical transmission method comprising:

outputting, by using a first light source for generating local oscillation light of a first carrier frequency allocated to the first node, a transmission optical signal that includes a first subcarrier optical signal with a first subcarrier established on a low-frequency side of the first carrier frequency and a second subcarrier optical signal with a second subcarrier established on a high-frequency side of the first carrier frequency;

splitting the transmission optical signal by using an optical splitter so as to generate a first optical signal and a second optical signal;

transmitting the first optical signal and the second optical signal respectively to a first adjacent node and a second adjacent node;

combining an optical signal received from the first adjacent node and an optical signal received from the second adjacent node by using an optical coupler; and recovering, by using the first light source, a first reception signal carried by the first subcarrier and a second reception signal carried by the second subcarrier from an output optical signal of the optical coupler, wherein a difference between a frequency of the first light source and a frequency of a light source implemented in the first adjacent node corresponds to a bandwidth of the first subcarrier.

* * * * *